United States Patent [19]
Hirai et al.

[11] Patent Number: 5,481,632
[45] Date of Patent: Jan. 2, 1996

[54] OPTICAL WAVEGUIDE MODULE AND METHOD OF MANUFACTURING THE SAME

[75] Inventors: Shigeru Hirai; Kazunori Kurima; Masahide Saito; Dai Yui; Tomoyuki Hattori; Hiroshi Suganuma, all of Yokohama, Japan

[73] Assignee: Sumitomo Electric Industries, Ltd., Osaka, Japan

[21] Appl. No.: 248,885

[22] Filed: May 25, 1994

[30] Foreign Application Priority Data

May 26, 1993 [JP] Japan ..................... 5-123947
Jun. 25, 1993 [JP] Japan ..................... 5-155360
Nov. 16, 1993 [JP] Japan ..................... 5-286825

[51] Int. Cl.$^6$ ..................... G02B 6/30
[52] U.S. Cl. ..................... 385/49; 385/50; 385/80
[58] Field of Search ..................... 385/49, 50, 27, 385/28, 46, 80, 95

[56] References Cited

U.S. PATENT DOCUMENTS

4,948,219  8/1990  Seino et al. ..................... 385/95

FOREIGN PATENT DOCUMENTS

| 283301 | 9/1988 | European Pat. Off. . |
| 324492 | 7/1989 | European Pat. Off. . |
| 422445 | 4/1991 | European Pat. Off. . |
| 63-96609 | 4/1988 | Japan . |
| 64-211418 | 3/1991 | Japan . |
| 4355413 | 12/1992 | Japan . |
| 534543 | 2/1993 | Japan . |

OTHER PUBLICATIONS

Yamada et al., "Low–Loss and Stable Fiber–to–Waveguide Connection Utilizing UV Curable Adhesive," IEEE Photonics Technology Letters, vol. 4, No. 8, Aug. 1992, pp. 906–908.

Patent Abstracts of Japan, vol. 16, No. 109, Mar. 17, 1992, p. 1326.
Patent Abstracts of Japan, vol. 17, No. 461, Aug. 23, 1993, p. 1598.
Patent Abstracts of Japan, vol. 17, No. 387, Jul. 20, 1993, p. 1576.
Patent Abstracts of Japan, vol. 17, No. 320, Jun. 17, 1993, p. 1558.
Patent Abstracts of Japan, vol. 12, No. 231, Jun. 30, 1988, p. 723.

*Primary Examiner*—John D. Lee
*Assistant Examiner*—Phan T. H. Palmer
*Attorney, Agent, or Firm*—Cushman Darby & Cushman

[57] ABSTRACT

An optical waveguide module according to the present invention comprises an optical waveguide substrate having an optical waveguide formed therein, an optical waveguide holder for mounting the optical waveguide substrate thereon, an optical fiber connector supporting an optical fiber therein, and an optical fiber holder for mounting the optical fiber connector thereon, the end faces of the optical waveguide holder and the optical fiber holder are brought into contact with each other while aligning the optical waveguide and the optical fiber, the end faces of the optical waveguide substrate and the optical fiber connector are bonded at least partially through a gap, and a hardening matching agent having a refractive index matching with those of the optical waveguide and the optical fiber is filled in the gap. Therefore, the optical waveguide and the optical fiber do not wear out or are damaged when alignment is performed, and stable coupling characteristics between the optical waveguide and the optical fiber can be obtained by the sufficiently filled hardening matching agent.

54 Claims, 16 Drawing Sheets

OPTICAL WAVEGUIDE MODULE AND METHOD OF MANUFACTURING THE SAME

BACKGROUND OF THE INVENTION

1. Field of the Invention

The present invention relates to an optical waveguide module used in an optical communication network or the like and manufactured by connecting an optical waveguide holder and optical fiber holders and a method of manufacturing the same.

2. Related Background Art

In recent years, with the progress of techniques in optical communication, optical information processing or the like, it is strongly desired to achieve connection of a single mode transmission optical fiber (to be abbreviated as a single mode fiber hereinafter) and an optical waveguide constituting an optical coupling circuit or an optical branching circuit with high reliability. In this case, the diameter of the core of a single mode fiber is about several μm to 10 μm. Therefore, when a single mode optical fiber is connected to an optical waveguide, the relative positional shift between them must be reduced to be 1 μm or less to prevent an increase in connection loss.

Conventionally, when an optical waveguide is connected to a single mode optical fiber, their relative positions are aligned while monitoring the connection loss. The contact surface of a holder for holding the optical waveguide is abutted against the contact surface of a holder for holding the optical fiber to achieve positioning with minimum connection loss. The butt portion between these holders is fixed by an adhesive or laser welding. A refractive index matching agent such as a matching oil is used on the connecting portion between the optical waveguide and the optical fiber to prevent reflection of light.

In a conventional optical waveguide module, optical fiber connectors connected to optical fibers are coupled with the two sides of an optical waveguide substrate having an optical waveguide with, for example, 1×8 branches through a refractive index matching agent. This optical waveguide substrate is mounted on a stainless steel optical waveguide holder having a substantially U-shaped section. Each optical fiber connector is mounted on a stainless steel optical fiber holder having a bottom surface and a substantially U-shaped section.

A single mode optical fiber whose coating portion is removed is buried in one optical fiber connector. A plurality of single mode optical fibers whose coating portions are removed and whose connecting end portions are coupled with each other are buried in the other optical fiber connector. The butt portions between the optical waveguide holder and the optical fiber holders are integrally formed by UV bonding or spot welding using a YAG (Yttrium Aluminum Garnet) laser. With this structure, light incident from the optical fiber connected to one optical fiber connector is branched into eight light beams in the optical waveguide of the optical waveguide substrate and transmitted to the eight optical fibers connected to the other optical fiber connector.

In such an optical waveguide module, the end faces of the optical waveguide and the end faces of the holder for holding the optical waveguide, or the end faces of the optical fibers and the end faces of the holders for holding the optical fibers are polished, and these end faces are aligned to form flat surfaces. For this reason, when the end faces of the optical waveguide and the optical fibers are brought into contact to adjust the position in positioning of the optical waveguide and the optical fibers, the optical junction portions between them wear out or are damaged to cause increase in connection loss.

In addition, the refraction index matching agent is filled in only very small gaps formed between the contact end faces of the optical waveguide substrate, the optical fiber connectors, and their holders. In this case, the refraction index matching agent flows away according to a change in temperature or the like to make the optical coupling characteristics unstable.

To solve the above problems, in Japanese Patent Application No. 4-58116 (not laid open) according to a prior application of the present applicant, the end face of the optical waveguide substrate or the optical fiber connector is retreated from the end face of their holder to secure a space for filling the refractive index matching agent. However, in Japanese Patent Application No. 4-58116, these members must be fixed such that the end face of the optical waveguide substrate or the optical fiber connector is retreated from the end face of their holder by a predetermined amount, resulting in complicated assembling.

In addition, in a structure disclosed in Japanese Patent Laid-Open No. 4-355413, a water-impermeable coating is formed at the junction portion or side surfaces of the optical waveguide holder and the optical fiber holder, thereby preventing deterioration of each optical component caused by heat and moisture. However, in Japanese Patent Laid-Open No. 4-355413, when the optical waveguide and the optical fibers are aligned, the connecting portions between them are damaged.

Furthermore, in UV bonding, a fluid UV curing resin material is coated on the butt portion between the optical waveguide holder and the optical fiber holder to bond the two components. However, the UV resin material shrinks upon hardening. For this reason, the optical waveguide substrate and the optical fiber connectors are shifted to cause an optical axial misalignment between the optical waveguide and the optical fiber. However, since the alignment precision must be held within 0.1 μm for connection of an optical fiber, the problem of an optical axial misalignment cannot be ignored.

On the other hand, in welding using a YAG laser, for example, four portions at two sides of the butt portion between the optical waveguide holder and the optical fiber holder are welded. When these welding portions are welded, a thermal stress is generated to cause move most of the optical waveguide substrate and the optical fiber connector in the normal direction with respect to the surface of the butt portion. This movement particularly tends to become non-uniform at the welding portions of each side. For this reason, fixing of the optical waveguide substrate and the optical fiber connector is unreliable, and at the same time, an optical axial misalignment tends to occur.

To solve the above problem, in a structure disclosed in japanese Patent Laid-Open No. 3-75708, a wax agent is held in the junction portion between the optical waveguide holder and the optical fiber holder, and the output of the YAG laser is adjusted to avoid any optical axial misalignment. However, in Japanese Patent Laid-Open No. 3-75708, the materials of the optical waveguide substrate, the optical fiber connector, and their holders are different. Therefore, stable optical coupling characteristics cannot be obtained because of thermal expansion or shrinkage based on a change in temperature.

As described above, in the conventional coupling method in which the end faces of the optical waveguide holder and the optical fiber connector holder are abutted each other, and the contact surfaces are fixed by UV bonding or YAG welding, fixing of the optical waveguide substrate to the optical fiber connector is unreliable, or an optical axial misalignment occurs at the connecting portion between the optical waveguide and the optical fiber.

YAG welding has been examined as an excellent fixing method because, for example, the fixing strength can be increased. However, when an air layer having a refractive index different from that of the optical waveguide substrate or the optical fiber connector is inserted between the optical waveguide substrate and the optical fiber connector to cause light reflection, light signals are not correctly transmitted between the optical waveguide substrate and the optical fiber connector. To avoid this disadvantage, refractive index matching between the two members need to be performed by using a refractive index matching agent. As a refractive index matching agent, a matching oil using silicone oil or the like or a resin disclosed in Japanese Patent Laid-Open No. 5-34543 has been conventionally applied.

However, when a matching oil is used as the refractive index matching agent, the matching oil flows away to make the long-term reliability poor. In the invention disclosed in Japanese Patent Laid-Open No. 5-34543, it is necessary to perform seam welding to hermetically seal the resin and harden the resin after this hermetic sealing. If a gas is generated from the resin by heat applied at the time of hardening, this gas is entrapped because there is no spill port. The presence of such a gas largely degrades the performance of the optical waveguide module.

SUMMARY OF THE INVENTION

It is an object of the present invention to provide an optical waveguide module having a junction structure of an optical waveguide and optical fibers, which solves the above problems, and a method of manufacturing the same.

In order to achieve the above object, according to the present invention, there is provided an optical waveguide module comprising an optical waveguide holder, an optical waveguide substrate mounted in the optical waveguide holder, an optical waveguide formed in the optical waveguide substrate and an optical fiber holder, an optical fiber connector mounted in the optical fiber holder and an optical fiber supported by the optical fiber connector and having end faces exposed from the optical fiber connector, wherein end faces of the optical waveguide holder and the optical fiber holder are brought into contact with each other while aligning the optical waveguide and the optical fiber, end faces of the optical waveguide substrate and the optical fiber connector are bonded at least partially through a gap, and a hardening matching agent having light transmission properties is filled in the gap. In other words, the gap means a space having a predetermined distance between the end face of the optical waveguide (or the optical waveguide substrate) and the end face of the optical fiber (or the optical fiber connector).

The gap may be formed between the end face of the optical waveguide, which is retreated from the end faces of the optical waveguide holder and the optical waveguide substrate, and the end face of the optical connector. Alternatively, the gap may be formed between the end face of the optical fiber, which is retreated from the end faces of the optical fiber holder and the optical fiber connector, and the end face of the optical waveguide. The gap may also be formed between the end face of the optical waveguide substrate, which is retreated from the end faces of the optical waveguide holder and the optical waveguide, and the end face of the optical fiber connector. The gap may be formed between the end face of the optical fiber connector, which is retreated from the end faces of the optical fiber holder and the optical fiber, and the end face of the optical waveguide substrate.

In such an optical waveguide module, the end faces of the optical waveguide substrate and the optical fiber connector are bonded at least partially through a gap so that the hardening matching agent having a refractive index matching with those of the optical waveguide and the optical fiber is filled in the gap. For this reason, the optical waveguide and the optical fiber do not wear or are damaged when alignment is performed. Therefore, stable coupling characteristics between the optical waveguide and the optical fiber can be obtained by the sufficiently filled hardening matching agent.

In order to achieve the above object, according to the present invention, there is provided the first method of manufacturing an optical waveguide module, comprising the first step of mounting an optical waveguide substrate having an optical waveguide formed therein on an optical waveguide holder, mounting an optical fiber connector supporting an optical fiber therein on an optical fiber holder, and integrally polishing end faces of the optical waveguide, the optical waveguide substrate, and the optical waveguide holder, and end faces of the optical fiber, the optical fiber connector, and the optical fiber holder, respectively, the second step of dipping the end face of the optical waveguide substrate in a predetermined etching solution to at least partially remove the end face of the optical waveguide substrate to be retreated from the end face of the optical waveguide holder, the third step of bringing the end faces of the optical waveguide holder and the optical fiber holder into contact with each other while aligning the optical waveguide and the optical fiber, and filling a hardening matching agent having light transmission properties in a gap formed by bonding the end faces of the optical waveguide substrate and the optical fiber connector, and the fourth step of hardening the hardening matching agent to fix a junction portion between the optical waveguide substrate and the optical fiber connector.

In order to achieve the above object, according to the present invention, there is provided the second method of manufacturing an optical waveguide module, comprising the first step of mounting an optical waveguide substrate having an optical waveguide formed therein on an optical waveguide holder, mounting an optical fiber connector supporting an optical fiber therein on an optical fiber holder, and integrally polishing end faces of the optical waveguide, the optical waveguide substrate, and the optical waveguide holder, and end faces of the optical fiber, the optical fiber connector, and the optical fiber holder, respectively, the second step of dipping the end face of the optical fiber connector in a predetermined etching solution to at least partially remove the end face of the optical fiber connector to be retreated from the end face of the optical fiber holder, the third step of bringing the end faces of the optical waveguide holder and the optical fiber holder into contact with each other while aligning the optical waveguide and the optical fiber, and filling a hardening matching agent having light transmission properties in a gap formed by bonding the optical waveguide substrate and the optical fiber connector, and the fourth step of hardening the hardening matching agent to fix a junction portion between the optical waveguide substrate and the optical fiber connector.

In these first and second methods of manufacturing the optical waveguide modules, the end face of the optical waveguide substrate or the optical fiber connector is at least partially etched and removed to form a gap between the optical waveguide substrate and the optical fiber connector. For this reason, the interval between the end faces of the optical waveguide substrate and the optical fiber connector in the gap is set by accurate control. Therefore, the light loss amount by the hardening matching agent between the optical waveguide and the optical fiber is set at an allowable value. At the same time, the peeling frequency of the hardening matching agent because of a thermal stress between the optical waveguide holder and the optical fiber holder and between the optical waveguide substrate and the optical fiber connector is set at an allowable value.

In order to achieve the above object, according to the present invention, there is provided the third method of manufacturing an optical waveguide module, comprising the first step of bringing an end face of an optical waveguide holder mounting thereon an optical waveguide substrate having an optical waveguide formed therein and an end face of an optical fiber holder mounting thereon an optical fiber connector supporting an optical fiber therein into contact with each other while aligning the optical waveguide and the optical fiber, the second step of injecting a hardening matching agent having light transmission properties and a Young's modulus corresponding to a thermal stress between the optical waveguide holder and the optical fiber holder and between the optical waveguide substrate and the optical fiber connector into a junction portion between the optical waveguide substrate and the optical fiber connector and aligning the optical waveguide and the optical fiber, the third step of fixing a junction portion between the optical waveguide holder and the optical fiber holder by YAG laser welding, and the fourth step of hardening the hardening matching agent to fix the junction portion between the optical waveguide substrate and the optical fiber connector.

In the third method of manufacturing an optical waveguide module, the optical waveguide and the optical fiber are aligned, and the junction portion between the optical waveguide holder and the optical fiber holder is then fixed by YAG laser welding, thereby maintaining a sufficient mechanical strength of the junction portion. In addition, as a postprocess of the YAG laser welding, the junction portion between the optical waveguide substrate and the optical fiber connector is fixed by hardening the hardening matching agent, thereby minimizing an axial misalignment between the optical waveguide and the optical fiber. For this reason, the coupling characteristics between the optical waveguide and the optical fiber have high reliability. Furthermore, since the hardening matching agent has a Young's modulus corresponding to the thermal stress between the optical waveguide holder and the optical fiber holder and between the optical waveguide substrate and the optical fiber connector, thermal expansion or shrinkage caused due to variations in temperature is reduced because the hardening matching agent serves as a buffer layer. Therefore, stable coupling characteristics between the optical waveguide and the optical fiber can be obtained.

In order to achieve the above object, according to the present invention, there is provided the fourth method of manufacturing an optical waveguide module, comprising the first step of bringing end face of an optical waveguide holder mounting thereon an optical waveguide substrate having an optical waveguide formed therein and an end face of an optical fiber holder mounting thereon an optical fiber connector supporting an optical fiber therein into contact with each other and injecting a hardening matching agent having light transmission properties into a junction portion between the optical waveguide substrate and the optical fiber connector, the second step of aligning the optical waveguide and the optical fiber and fixing a junction portion between the optical waveguide holder and the optical fiber holder by spot welding, the third step of hardening the hardening matching agent to fix the junction portion between the optical waveguide substrate and the optical fiber connector, and the fourth step of hermetically sealing the junction portion between the optical waveguide holder and the optical fiber holder by seam welding.

In the fourth method of manufacturing an optical waveguide module, after the optical waveguide and the optical fiber are aligned, the junction portion between the optical waveguide holder and the optical fiber holder is temporarily fixed by spot welding, and the hardening matching agent is hardened to fix the junction portion between the optical waveguide substrate and the optical fiber connector, thereby removing a gas generated when the hardening matching agent is hardened from a gap of the junction portion. For this reason, the coupling characteristics between the optical waveguide and the optical fiber are high. As a postprocess of hardening the hardening matching agent, the junction portion between the optical waveguide holder and the optical fiber holder is hermetically sealed by seam welding, thereby minimizing modification with time of the hardening matching agent caused due to external influence. For this reason, the coupling characteristics between the optical waveguide and the optical fiber ensure high long-term reliability.

In order to achieve the above object, according to the present invention, there is provided the fifth method of manufacturing an optical waveguide module, comprising the first step of dipping an optical waveguide holder mounting thereon an optical waveguide substrate having an optical waveguide formed therein and an optical fiber holder mounting thereon an optical fiber connector supporting an optical fiber therein into a refractive index matching agent having light transmission properties and bringing end faces of the optical waveguide holder and the optical fiber holder into contact with each other, and the second step of aligning the optical waveguide and the optical fiber and hermetically sealing a junction portion between the optical waveguide holder and the optical fiber holder by seam welding.

In the fifth method of manufacturing an optical waveguide module, the junction portion between the optical waveguide holder and the optical fiber holder is hermetically sealed by seam welding while being dipped in the refractive index matching agent, and so the refractive index matching agent filled in the junction portion does not flow away. Therefore, the coupling characteristics between the optical waveguide and the optical fiber ensure high long-term reliability.

DESCRIPTION OF THE PREFERRED EMBODIMENTS

Figure 1:
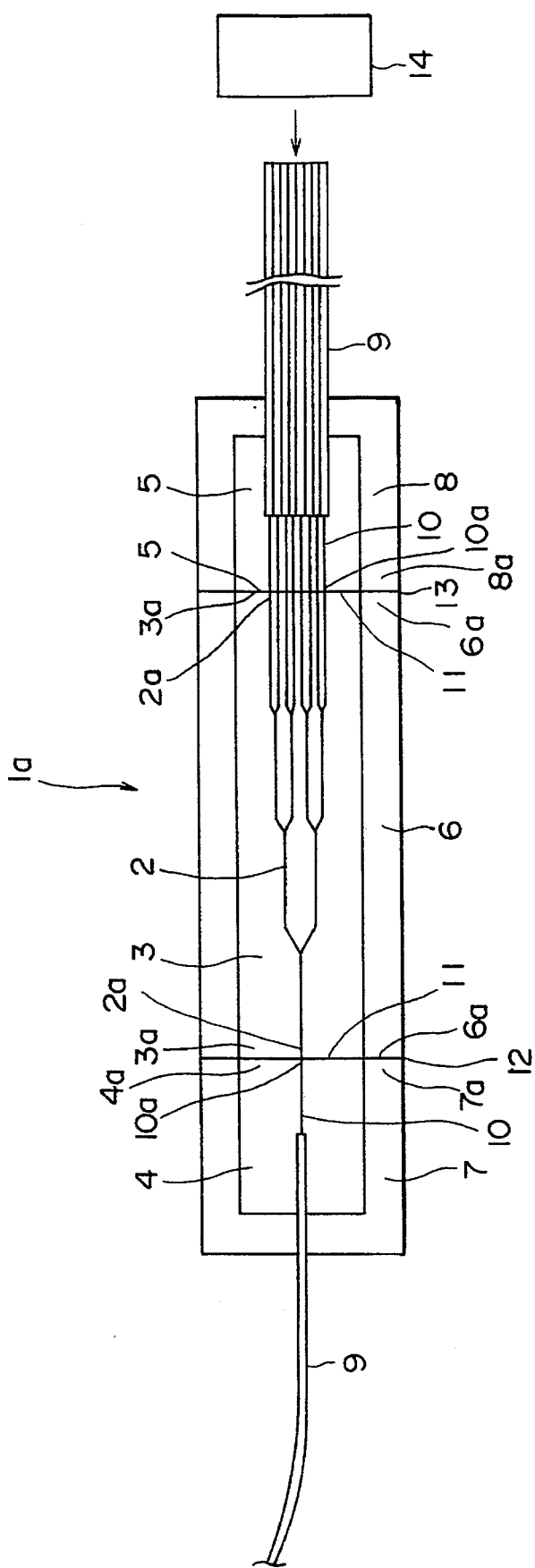
FIG. 1 is a plain view showing the structure of an optical waveguide module according to the first embodiment of the present invention.

The structures and the effects of the embodiments according to the present invention will be described below with reference to FIGS. 1 to 16. In a description of the drawings, the same reference numerals denote the same elements, and a detailed description thereof will be omitted. The sizes in the drawings do not necessarily accord with those in the description.

Figure 2:
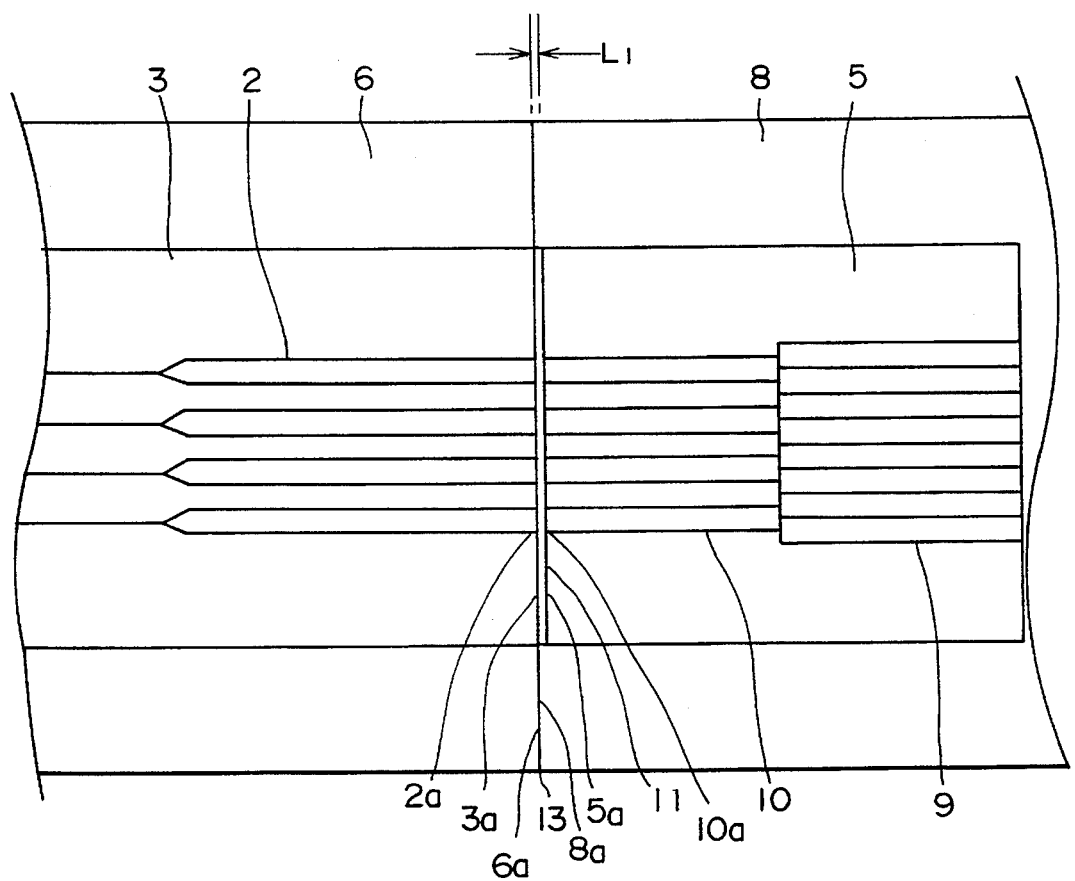
FIG. 2 is an enlarged plain view showing a junction portion between an optical waveguide unit and an optical fiber unit in the optical waveguide module in FIG. 1.
Figure 3:
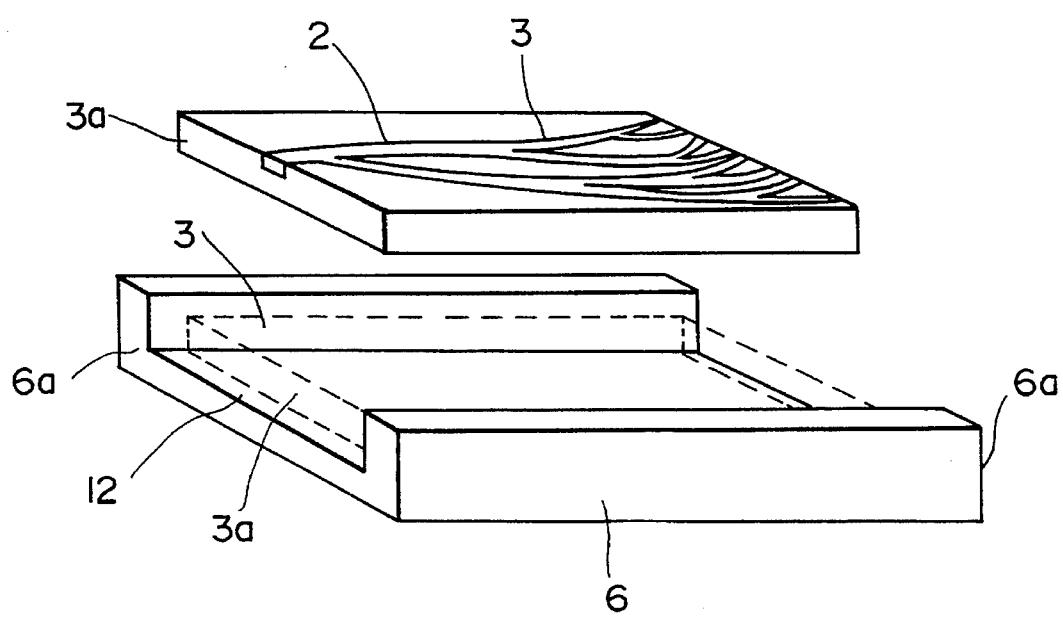
FIG. 3 is a perspective view showing a state in which an optical waveguide substrate and an optical waveguide holder in the optical waveguide module in FIG. 1 are separated from each other.

FIG. 1 is a plain view showing the structure of an optical waveguide module according to the first embodiment of the present invention. FIG. 2 is an enlarged plain view showing a junction portion between an optical waveguide unit and an optical fiber unit in the optical waveguide module in FIG. 1. FIG. 3 is a perspective view showing a state in which an optical waveguide substrate and an optical waveguide holder in the optical waveguide module in FIG. 1 are separated from each other.

In an optical waveguide module la, optical fiber connectors 4 and 5 connected to optical fibers are disposed on the two sides of an optical waveguide substrate 3 having an optical waveguide 2. The optical waveguide substrate 3 is mounted on a substantially U-shaped stainless steel optical waveguide holder 6. The optical fiber connectors 4 and 5 are mounted on substantially U-shaped optical fiber holders 7 and 8 having stainless steel bottom surfaces, respectively.

A single mode optical fiber 10 whose jacket 9 is removed is buried in the optical fiber connector 4. A plurality of single mode optical fibers 10 whose jackets 9 are removed and whose connecting end portions are coupled with each other are burried in the optical fiber connector 5. The butt end portion between the optical waveguide holder 6 and the optical connector holder 7 or 8 is appropriately spot-welded by a YAG (Yttrium Aluminum Garnet) laser to be integrally formed. Light incident from one optical fiber 10 is branched into eight light beams in the optical waveguide 2 and transmitted to the eight optical fibers 10.

The present inventor built a prototype according to this embodiment, and this will be described below. The optical waveguide having the 1×8 branch structure shown in FIG. 1 was formed in the optical waveguide substrate. The two end faces of this optical waveguide substrate were polished in advance and cut to be mounted on the separately prepared optical waveguide holder. This holder was processed to have a total length about 20 μm longer than that of the optical waveguide substrate. As the material of the holder, a stainless steel-based material, kovar, invar or the like is used. Positioning of the optical waveguide holder prepared in this manner and the optical fiber holder was performed using the method shown in FIG. 1. At that time, a UV curing adhesive 11 consisting of a fluorine-compound-added acrylate resin having a Young's modulus of 8 kgf/mm$^2$ and a refractive index of 1.44 was filled in the gaps between the optical waveguide substrate and the optical fiber connector.

In the first embodiment, an end face 3a of the optical waveguide substrate 3 is recessed from an end face 6a of the optical waveguide holder 6 by only a predetermined size $L_1$.

First of all, the optical waveguide holder 6 is set next to the optical fiber holder 8. The optical waveguide 2 and the optical fibers 10 are aligned in the vertical and horizontal directions using an XYZ stage (not shown). The UV curing resin 11 is then coated on the butt surfaces of the holders, which are set next to each other. An end face 8a of the optical fiber holder 8 is brought into tight contact with the end face 6a of the optical waveguide holder 6 while aligning the optical waveguide 2 and the optical fibers 10 again in the vertical and horizontal directions using the XYZ stage. After the alignment, a YAG laser beam is radiated on the end faces 6a and 8a to weld them.

After welding, an Hg lamp 14 adjacently arranged at the tape-like rear end of the optical fibers 10 is turned on to cause UV light (365 nm) indicated by an arrow in FIG. 1 to be incident on the optical fibers 10 and the optical waveguide 2, thereby hardening the central portion of the UV curing adhesive 11. At the same time, the periphery of the UV curing adhesive 11 can be irradiated by the UV rays and hardened. According to the above coupling method, the UV rays are radiated from the periphery to harden the UV curing adhesive 11, and at the same time, the UV light is incident on the optical waveguide 2 and optical fibers 10, which are set next to each other, to harden a portion near the core portion of the UV curing adhesive 11. In this case, the portion near the core portion is reliably hardened, and the cores of the optical waveguide 2 and the optical fibers 10 hardly vary in position during and after the hardening. Therefore, the vertical and horizontal shifts of the cores of the optical waveguide 2 and the optical fibers 10 positioned at the central portion of the UV curing adhesive 11 are greatly reduced.

For the coupled apparatus prepared by the above method, a heat cycle test in a temperature range of −10° to 70° C. and an environmental test at a temperature of 80° C. and a humidity of 95% were performed. The increase in insertion loss was 0.3 dB or less. The adhesive of the present invention has functions of not only bonding the end faces to be bonded but also absorbing any shape variation component generated by a change in temperature. For this purpose, the Young's modulus of the adhesive is preferably 100 kgf/mm$^2$ or less.

In addition, to compensate the gap between the bonding end faces or the axial misalignment between the optical waveguide and the optical fiber, the refractive index of the adhesive is preferably almost equal to those of the optical waveguide and the optical fiber. As the adhesive, a thermosetting adhesive having the above characteristics, for example, one mainly consisting of an epoxy resin can be applied.

According to the first embodiment, after the axes of the optical waveguide and the optical fibers are aligned, an adhesive having a low Young's modulus is injected between the coupling end faces, and the end faces are welded and fixed. Therefore, the mechanical strength of the junction portion can be ensured, thereby obtaining a coupled apparatus with high reliability. The adhesive is then hardened so that an axial misalignment caused during hardening can be minimized. Since the Young's modulus of the adhesive is low, the adhesive acts as a buffer layer even when the coupled apparatus expands or shrinks upon a change in temperature, thereby preventing generation of an excess force. In addition, the adhesive has matching characteristics, so that an increase in coupling loss caused due to the axial misalignment, a gap or the like can be minimized.

Figure 4:
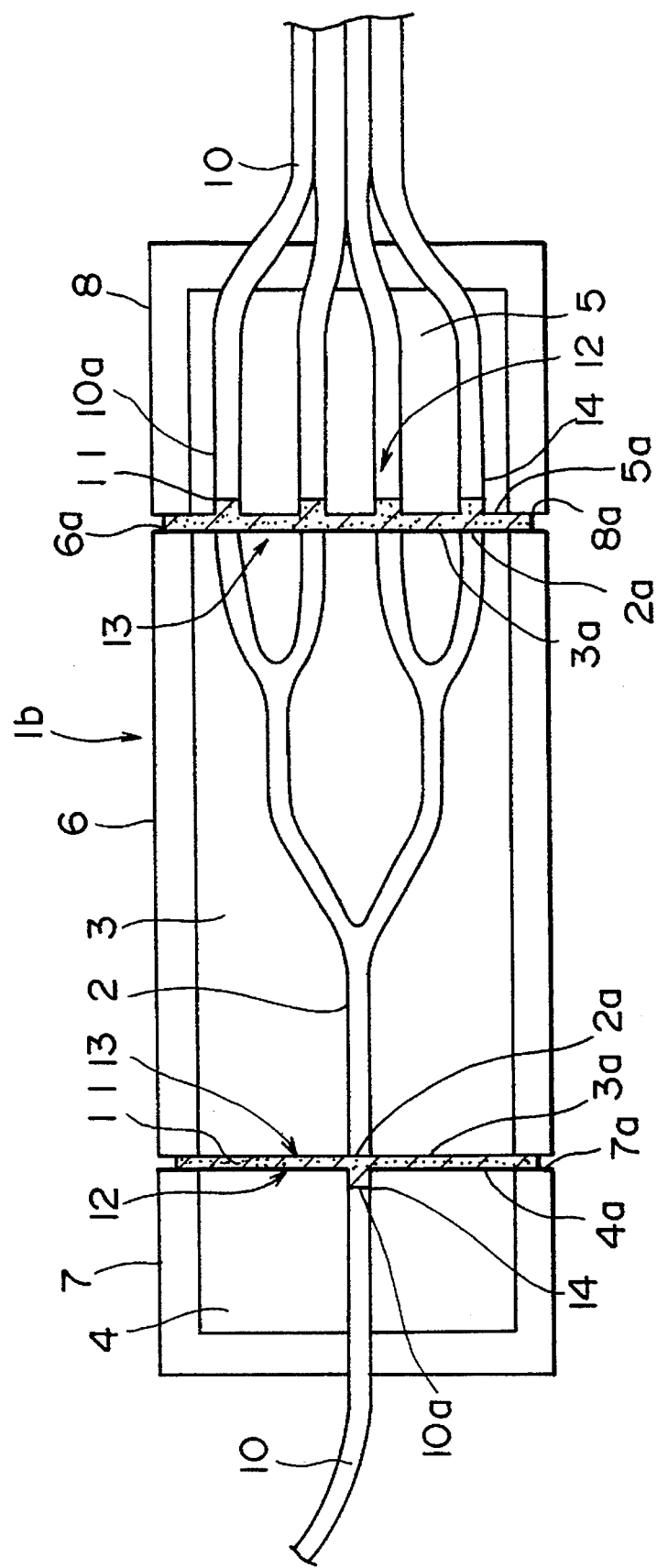
FIG. 4 is a plain view showing the structure of an optical waveguide module according to the second embodiment of the present invention.
Figure 5:
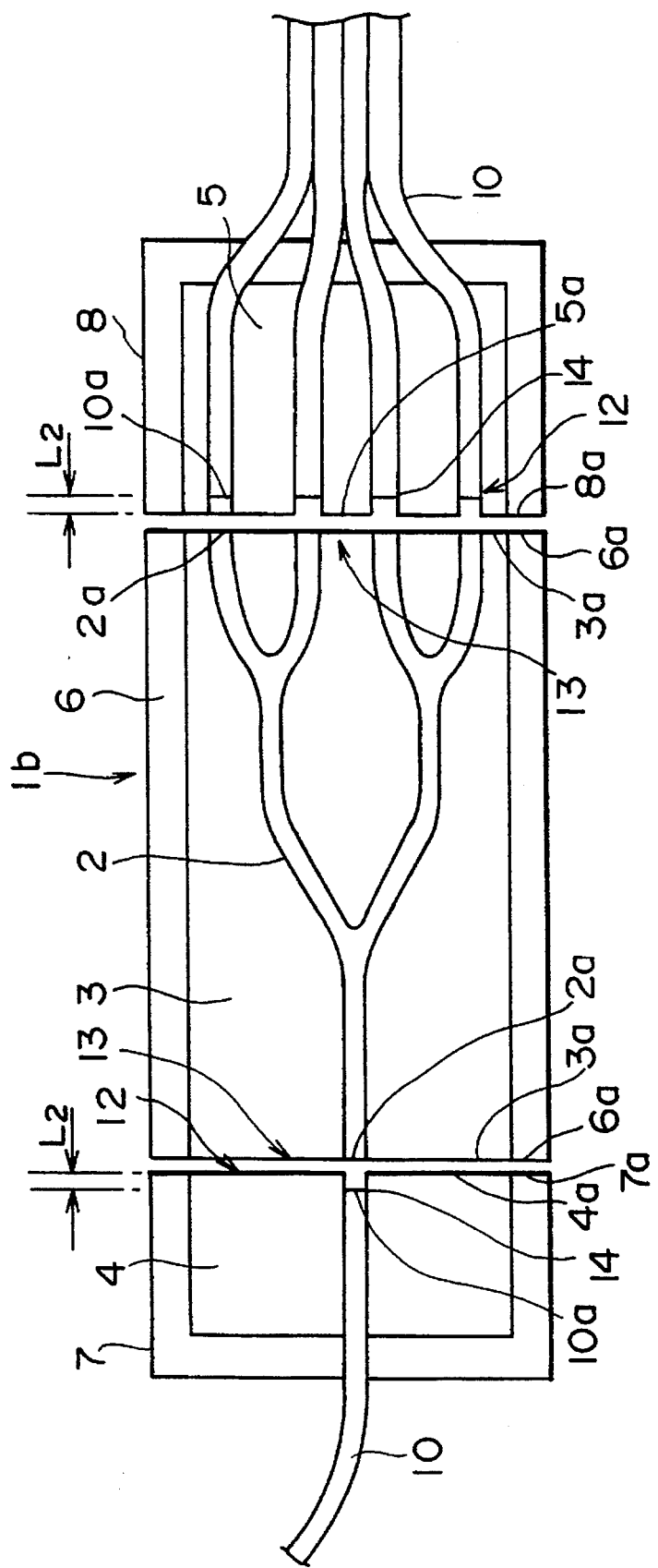
FIG. 5 is a plain view showing a state in which no refractive index matching agent is filled in a gap between an optical waveguide substrate and an optical fiber connector in the optical waveguide module in FIG. 4.

FIG. 4 is a plain view showing an optical waveguide module according to the second embodiment of the present invention. FIG. 5 is a plain view showing a state in which no refractive index matching agent is filled in a gap between an optical waveguide substrate and an optical fiber connector in FIG. 4.

In an optical waveguide module 1b according to the second embodiment, as shown in FIG. 5, the connecting end portion of an optical fiber 10 on the light incident side, whose jacket is removed, is buried in a first optical fiber connector 4. The optical fiber connector 4 is mounted on an optical fiber holder 7 having a U-shape when viewed from the top and a bottom plate (not shown).

An incident-side end face 2a of an optical waveguide 2 formed in an optical waveguide substrate 3 is arranged to oppose an end face 10a of the optical fiber 10 supported by the first optical fiber connector 4. This optical waveguide 2 has a 1×4 branch structure. The waveguide substrate 3 has a bottom plate (not shown) and is mounted on an optical waveguide holder 6 having a U-shaped section. The exit-side end face 2a of the optical waveguide 2 is arranged to oppose the end faces 10a of a plurality of single mode optical fibers 10 held by a second optical fiber connector 5. The optical fiber connector 5 is mounted on an optical fiber holder 8 having a substantially U-shape when viewed from the top and a bottom plate (not shown).

In the above optical waveguide module 1b, each end face 10a of the left and right optical fibers 10 is arranged at a position recessed from an end face 4a or 5a of the corresponding optical fiber connector 4 or 5 by only a predetermined size $L_2$ (shown in FIG. 5) to constitute a first end face portion 12. The size $L_2$ of this recessed portion is preferably set within a range of 2 to 50 μm.

On the other hand, the end face 4a or 5a of the optical fiber connector 4 or 5 and an end face 7a or 8a of the corresponding optical fiber holder 7 or 8 are on the same plane. A refractive index matching agent 11 is filled in a recessed portion 14 formed between the fiber end face 10a and the connector end face 4a or 5a to prevent light reflection at the optical coupling portion. As this refractive index matching agent 11, a thermosetting acrylate resin or a thermosetting epoxy resin can be preferably used in addition to a matching oil. The characteristics of an acrylate resin and an epoxy resin used as a matching adhesive are shown in Table 1.

TABLE 1

| Name of matching adhesive | Lacstrap*[1] | Epotec*[2] |
|---|---|---|
| Refractive index | 1.45 | 1.51 |
| Glass transition temperature (°C.) | 58 | 60 |
| Coefficient of thermal expansion ($K^{-1}$) | $2 \times 10^{-4}$ | $1.8 \times 10^{-4}$ |
| Young's modulus (kgf/mm$^2$) | 8 | ≦100 |
| Bond strength (kgf/cm$^2$) | 170 | — |

*[1]: fluorine-compound-added acrylate resin available from ICI
*[2]: epoxy resin available from Epoxy Technology Inc.

The first end face portion 12 defined by a non-flat surface and consisting of the connector end face 4a or 5a and the fiber end face 10a is manufactured in the following process.

In a state in which the optical fiber connector 4 or 5 is mounted on the optical fiber holder 7 or 8, the connector end face 4a or 5a, the fiber end face 10a, and the holder end face 7a or 8a are on almost the same plane. In this state, the end faces 4a, 5a, 10a, 7a, and 8a are polished.

The optical fiber connectors 4 and 5 are dipped in a 5% aqueous solution of hydrofluoric acid at 20° C. for about one hour together with the optical fiber holders 7 and 8. At this time, only the optical fibers 10 are etched, and the fiber end face 10a is retreated from the connector end face 4a or 5a by about 5 μm.

The present inventor performed positioning of the holders each having the optical fiber connector mounted thereon and the holder having the optical waveguide substrate mounted thereon, all of which are prepared according to the above method. At that time, the refractive index matching agent 11 was filled in a gap between the end face 2a of the optical waveguide 2 and the end face 10a of the optical fiber 10. After positioning of the optical waveguide 2 and the optical fiber 10, the contact end faces of the optical waveguide holder 6 and the optical fiber connectors 7 and 8 were fixed by YAG welding.

For the optical waveguide module 1b prepared with the above size, loss variations were measured while the temperature was changed within a range of −10° to 70° C., and very satisfactory values within a variation range of +0.2 dB were obtained. On the other hand, as a comparative example, for a conventional optical waveguide module in which the end faces of the optical waveguide and the optical fibers are not retreated from the end faces of the optical waveguide substrate and the optical fiber connectors, the loss variations were measured in the same temperature conditions. In this case, the loss variation range was as large as +0.5 dB.

In the second embodiment, the end face 2a of the optical waveguide 2 and the end face 3a of the optical waveguide substrate 3, both of which serve as a second end face portion 13, are on the same plane. However, by the same etching process as in the above embodiment, the end face 2a of the optical waveguide 2 may be retreated from the end face 3a of the optical waveguide substrate 3 by 2 to 50 μm (not shown). In this case, the end face 10a of the optical fiber 10 and the end face 4a or 5a of the optical fiber connector 4 or 5, both of which serve as the first end face portion 12, are on the same plane.

An experiment conducted to appropriately define the retreat amount of the fiber end face in this optical waveguide module 1b will be described below. In this case, the optical waveguide substrate and the optical fiber connectors consist of silicon. The optical waveguide holder and the optical fiber holders, all of which serve as housings, consist of an invar alloy or stainless steel (SUS304). The coefficients of thermal expansion of these materials are shown in Table 2.

TABLE 2

| Name of Material | Coefficient of thermal expansion (K$^{-1}$) |
|---|---|
| Silicon | $2.5 \times 10^{-6}$ |
| Invar alloy | $2 \times 10^{-6}$~$5 \times 10^{-6}$ |
| Stainless steel (SUS304) | $1.47 \times 10^{-5}$ |

Figure 6:
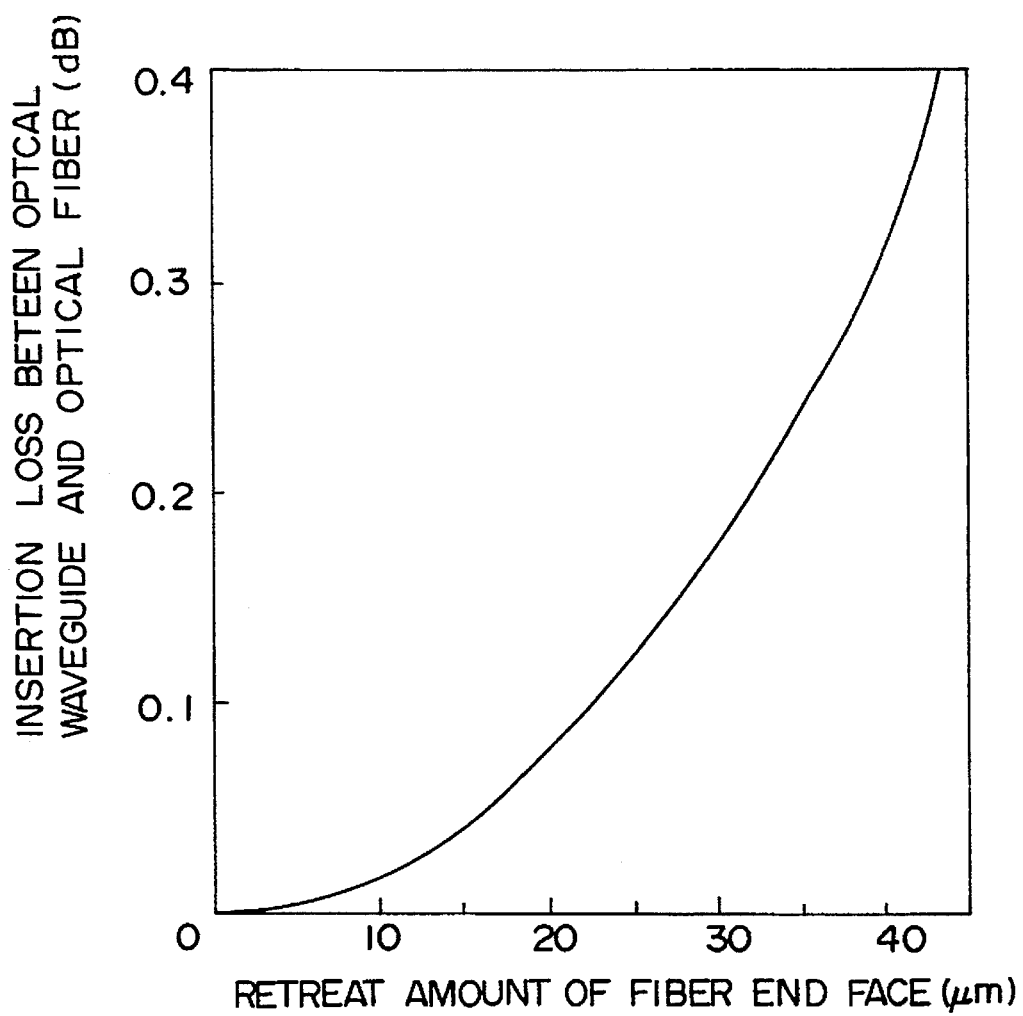
FIG. 6 is a graph showing the relationship between the retreat amount of a fiber end face and the insertion loss between an optical waveguide and an optical fiber in the optical waveguide module in FIG. 4.

FIG. 6 is a graph showing the relationship between the retreat amount of the fiber end face and the insertion loss between the optical waveguide and the optical fiber. According to this result, as the retreat amount of the fiber end face increases, the insertion loss between the optical waveguide and the optical fiber increases. Therefore, the maximum value related to the retreat amount of the fiber end face is assumed to be determined on the basis of the upper limit value allowable as the insertion loss.

Figure 7:
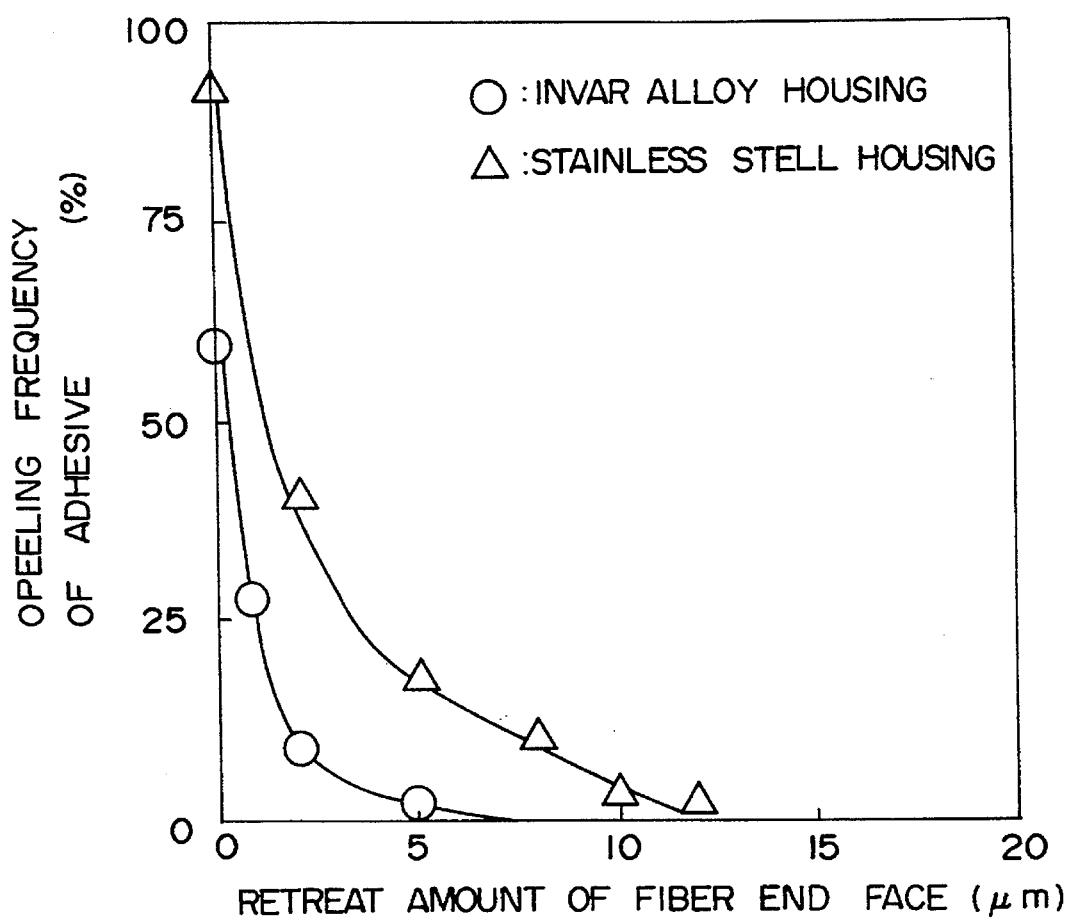
FIG. 7 is a graph showing the relationship between the retreat amount of the fiber end face and the peeling frequency of an adhesive in the optical waveguide module in FIG. 1.

FIG. 7 is a graph showing the relationship between the retreat amount of the fiber end face and the peeling frequency of the matching adhesive. According to this result, as the retreat amount of the fiber end face decreases, the peeling frequency of the matching adhesive increases. Therefore, the minimum value related to the retreat amount of the fiber end face is assumed to be determined on the basis of the required upper limit value of the peeling frequency.

Therefore, when the optical waveguide holder and the optical fiber holder are formed of an invar alloy, the retreat amount $L_2$ of the fiber end face is preferably set within a range of 2 to 30 µm. When the optical waveguide holder and the optical fiber holder are formed of stainless steel (SUS304), the retreat amount $L_2$ of the fiber end face is preferably set within a range of 5 to 30 µm.

Figure 8:
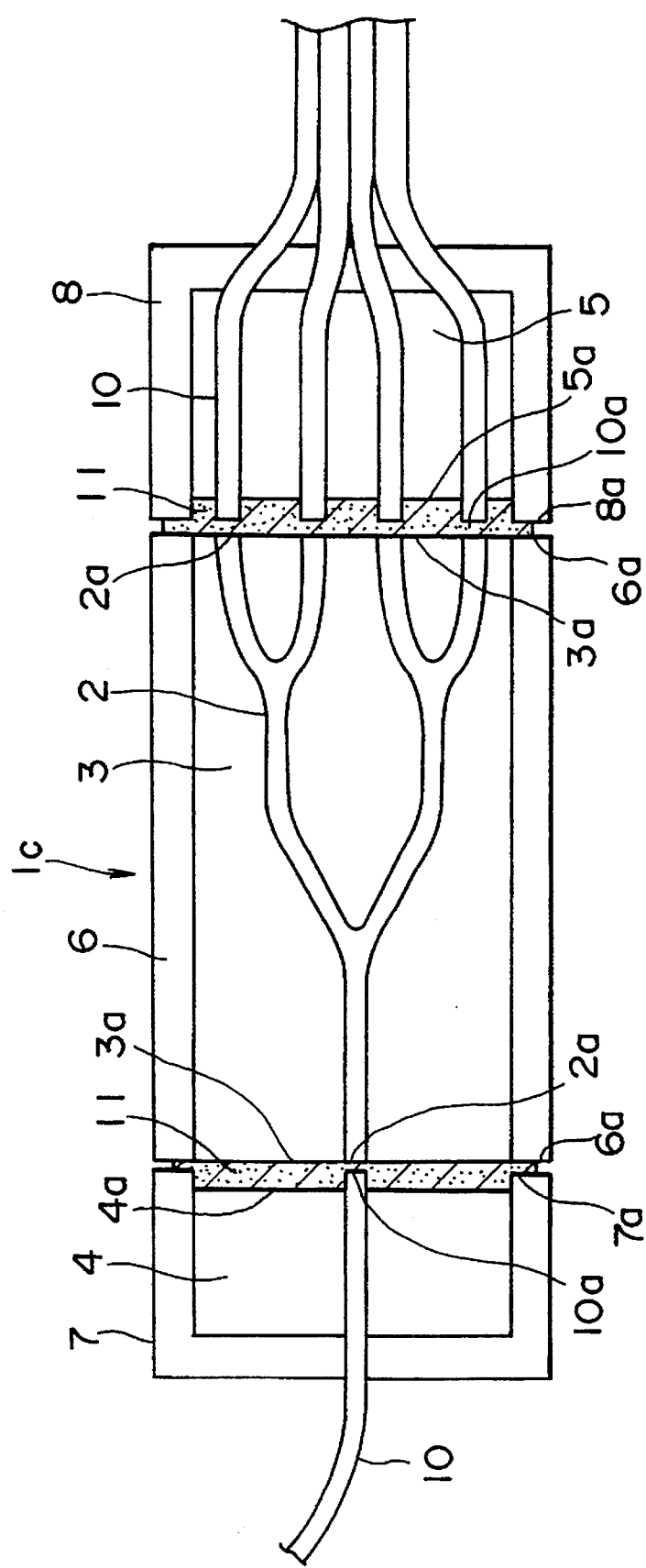
FIG. 8 is a plain view showing the structure of an optical waveguide module according to the third embodiment of the present invention.
Figure 9:
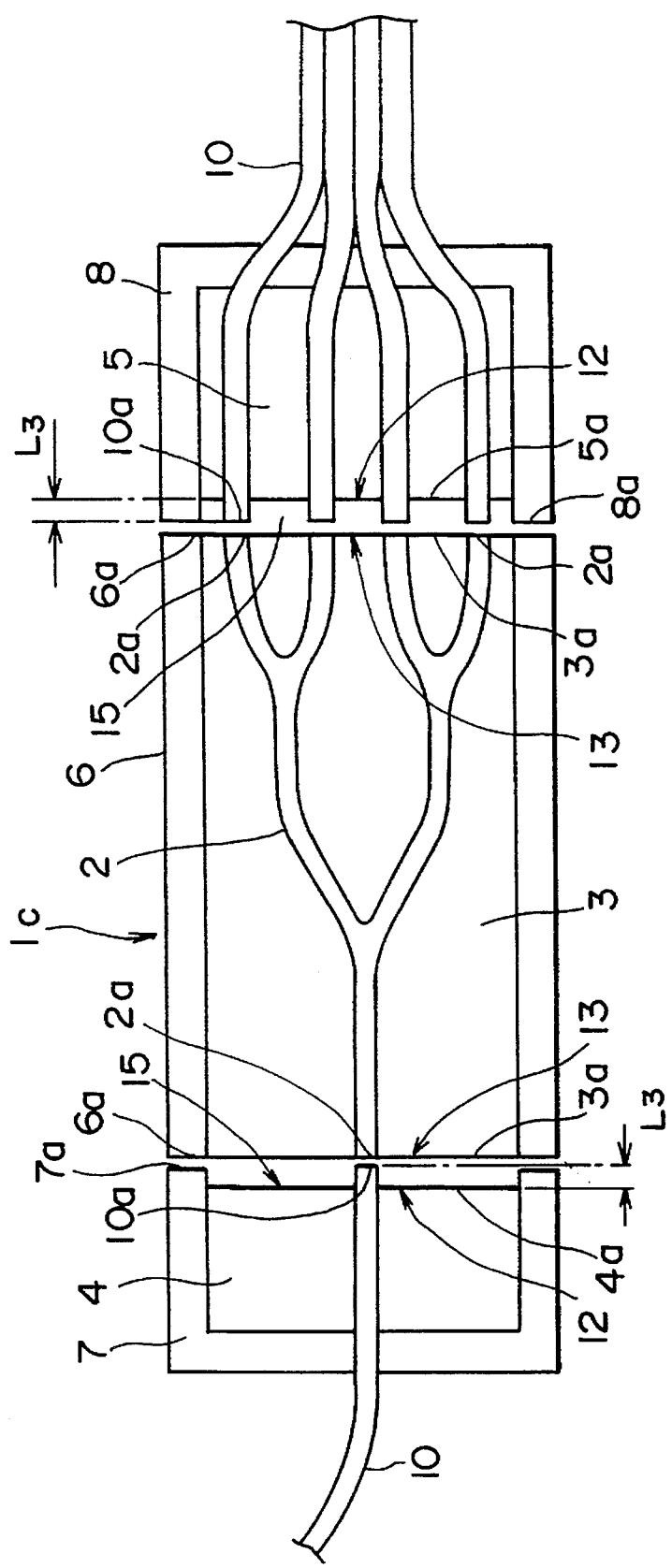
FIG. 9 is a plain view showing a state in which no refractive index matching agent is filled in a gap between an optical waveguide substrate and an optical fiber connector in the optical waveguide module in FIG. 8.

FIG. 8 is a plain view showing an optical waveguide module according to the third embodiment of the present invention. FIG. 9 is a plain view showing a state in which no refractive index matching agent is filled in a junction portion between an optical waveguide substrate and an optical fiber connector.

In an optical waveguide module 1c according to the third embodiment, contrary to the second embodiment, end faces 4a and 5a of optical fiber connector 4 and 5 are retreated from end faces 10a of optical fibers 10 by only a size $L_3$ (shown in FIG. 9). In the third embodiment, since an end face 7a or 8a of optical fiber holder 7 or 8 and the end face 10a of the optical fiber 10 are on the same plane, the connector end face 4a or 5a is at a position retreated from the corresponding holder end face 7a or 8a by only the size $L_3$. Therefore, a first end face portion 12 constituted by the fiber end face 10a and the connector end face 4a or 5a becomes a non-flat surface, and a recessed portion 15 is formed around the fiber end face 10a. The size $L_3$ is preferably set within a range of 2 to 100 µm.

The non-flat surface of the first end face portion 12 according to the third embodiment is prepared in the following process.

In preparing the optical fiber connector 4 or 5, an Si crystal was diced, a V groove was formed therein to obtain a fiber arranging member, and an optical fiber was arranged and fixed in the V groove of this fiber arranging member. After this optical fiber connector 4 and 5 were mounted on the optical fiber holders 7 and 8, respectively, the holder end faces 7a and 8a, the connector end faces 4a and 5a, and the fiber end faces 10a were polished to be flush with each other.

The optical fiber connectors 4 and 5 were dipped in a 30% aqueous solution of KOH at 50° C. for about one hour. As a result, the optical fibers 10 and the optical fiber holders 7 and 8 were not etched, and only the fiber arranging members of the optical fiber connectors 4 and 5 were etched. Therefore, the connector end faces 4a and 5a were retreated from the fiber end faces 10a by about 10 µm.

After the optical waveguide substrate 3 is mounted on the optical waveguide holder 6, the substrate end face 3a, the waveguide end face 2a, and the holder end face 6a are polished to be on the same plane.

Positioning of the optical fiber holders 7 and 8 having the optical fiber connectors 4 and 5 mounted thereon and the optical waveguide holder 6 having the optical waveguide substrate mounted thereon, all of which were prepared by the above method, was performed, and at the same time, the refractive index matching agent 11 was filled in the gap between the optical waveguide substrate 3 and the optical fiber connector 4 or 5, which includes the recessed portion 15. The contact end faces 6a, 7a, and 8a between the optical waveguide holder 6 and the optical fiber holders 7 and 8 were fixed by YAG welding.

For the optical waveguide module 1c prepared with the above size, a characteristic test was performed at a temperature of −10° to 70° C. As a result, the loss variation range was as small as +0.2 dB. On the other hand, for an optical waveguide module as a comparative example in which etching was not performed after the end faces were polished (i.e., the connector end face and the fiber end face are on the same plane), a temperature measurement test was performed at a temperature of −10° to 70° C. As a result, the variation range was as large as 0.5 dB.

Contrary to the third embodiment, the second end face portion 13 may be formed to be a non-flat surface. In this case, the first end face portion 12 can be formed to be a flat surface (not shown).

In this case, the end face portion can be prepared in the following process. That is, a waveguide chip having a quartz optical waveguide formed on an Si substrate is mounted on a holder, and the end faces are polished to be on the same plane. The waveguide chip is then dipped in the 30% aqueous solution of KOH at 50° C. for about one hour together with the holder. As a result, the optical waveguide and the holder are not etched, and only the Si waveguide substrate is etched, thereby obtaining a substrate end face retreated by about 10 µm.

After positioning of the end faces of the optical fiber holders and the optical waveguide holder is performed in this manner, the contact end faces of the holders are fixed by YAG welding. At this time, the refractive index matching agent is filled in the gaps between the optical waveguide substrate and the optical fiber connectors.

For the optical waveguide module prepared by the above method, a temperature characteristic measurement was performed in a temperature range of −10° to 70° C., as for the optical waveguide module of the third embodiment. As a result, the loss variation range was as small as +0.2 dB. On the other hand, for an optical waveguide module as a comparative example in which a optical waveguide was mounted on a holder, the end faces were polished, and etching was not performed (i.e., the waveguide end face and the substrate end face are on the same plane), a characteristic test was performed in the same temperature conditions. In this case, the loss variation range was as large as +0.5 dB.

According to the second and third embodiment, the end face of the optical fiber connector or the end face of the optical waveguide substrate is formed to be a non-flat surface. A necessary amount of a refractive index matching agent for optical coupling can be filled in the recessed portion formed in this non-flat surface. Therefore, the optical waveguide can be stably coupled with the optical fiber. In addition, after the optical fiber connector or the optical waveguide substrate is mounted on the holder, and the end face thereof is polished, etching is performed to cause the end face of the optical fiber or the optical waveguide to project or retreat from the end face of the optical fiber connector or the optical waveguide substrate. For this reason, the projecting or retreat amount can be correctly controlled so that the optical waveguide can optically coupled with the optical fiber at a high precision.

FIGS. 10 to 13 are perspective views sequentially showing steps in the manufacture of an optical waveguide module according to the fourth embodiment of the present invention.

An optical waveguide substrate 3 having an optical waveguide formed therein is prepared. This optical waveguide substrate 3 is formed of an Si crystal. As a material of the substrate, for example, ZnO, LiNbO$_3$, chalcogenide or the like can be used in addition to the Si crystal.

Figure 10:
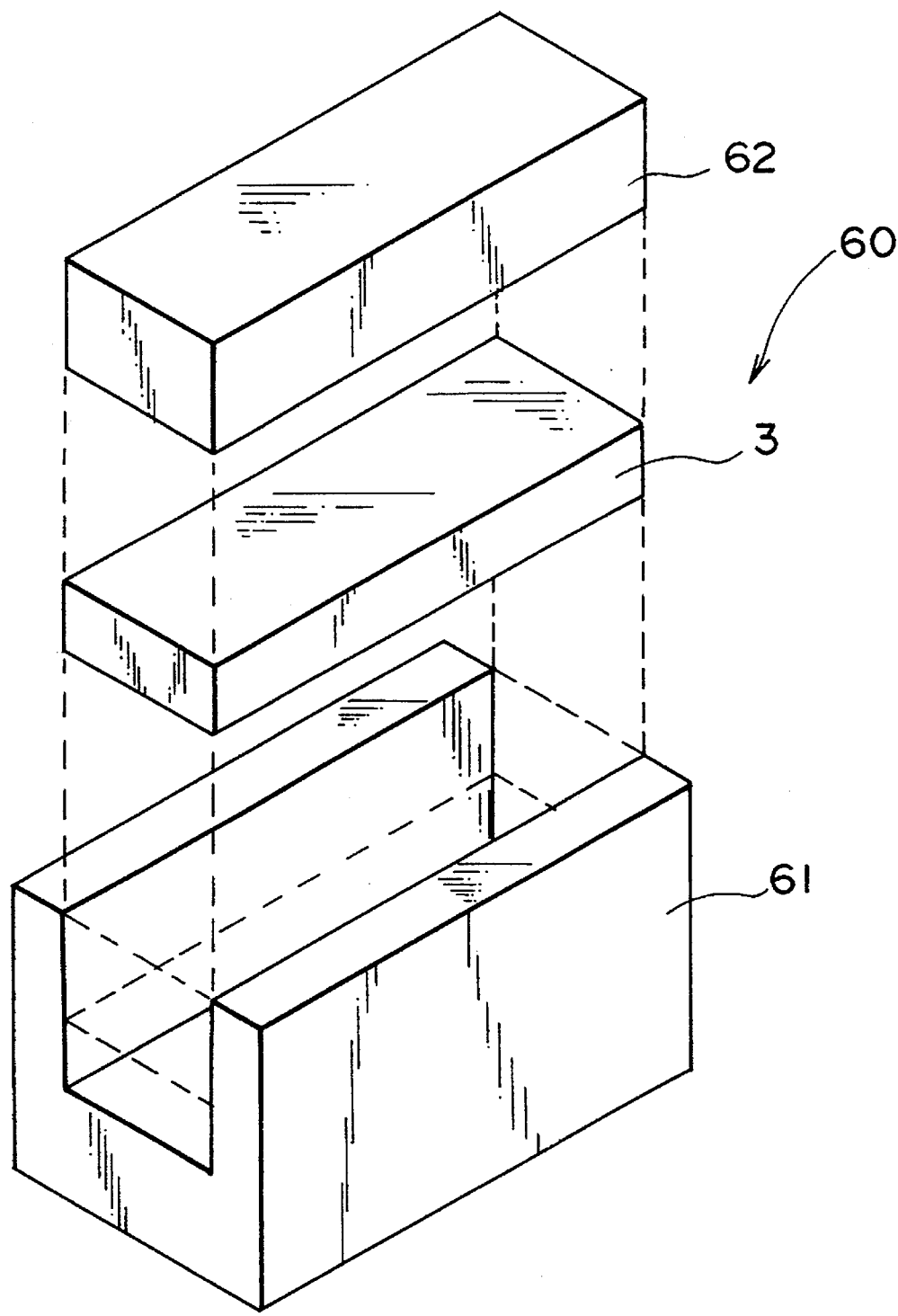
FIGS. 10 to 13 are perspective views sequentially showing steps in the manufacture of an optical waveguide according to the fourth embodiment of the present invention.

As shown in FIG. 10, the optical waveguide substrate 3 is fixed on an optical waveguide holder serving as a substrate fixing member constituted by a combination of a first metal housing 61 having a U-shaped section and a first metal plate 62 provided on the upper surface of the first metal housing 61, thereby forming an optical waveguide unit 60. The optical waveguide substrate 3 is fixed on the substrate fixing member by a resin injected into the first metal housing 61. As a resin used at this time, a (thermosetting) epoxy resin is generally used. However, an acryl resin or the like may also be used.

The end face of the optical waveguide unit 60 is then polished to reduce the connection loss when the optical waveguide unit 60 is connected to an optical fiber unit 70.

Besides the optical waveguide unit, optical fiber connectors 4 and 5 are prepared. In the optical fiber connectors 4 and 5, a plurality of optical fibers 10 are two- or three-dimensionally arranged and fixed by a predetermined substrate or the like. More specifically, the optical fiber connector 4 comprises a V groove substrate 41 consisting of an Si crystal and having a plurality of V groove guides, the optical fibers 10 mounted on these V groove guides, and a press plate 42 provided on the V groove substrate 41 to fix the optical fibers 10 and consisting of an Si crystal. Note that the optical fiber connector 5 has the same structure as of the optical fiber connector 4. As the optical fiber connectors 4 and 5, for example, a plastic material, a multicomponent glass, a silicone resin or the like may also be used in addition to the Si crystal.

Figure 11:
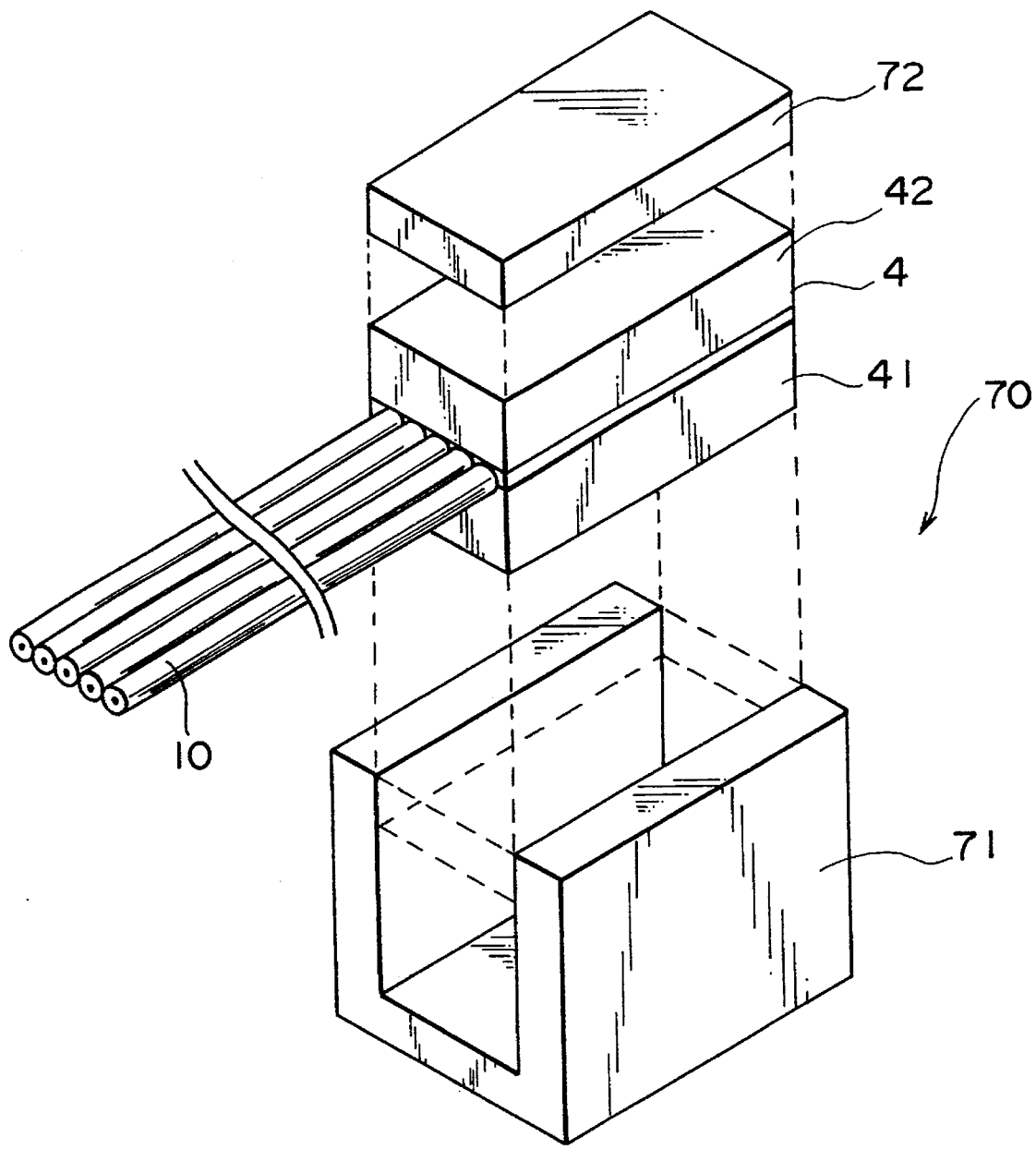

As shown in FIG. 11, the optical fiber connector 4 is fixed on an optical fiber holder serving as a fiber fixing member having a second metal housing 71 having a U-shaped section and a second metal plate 72 provided on the upper surface of the second metal housing 71, thereby forming the optical fiber unit 70. The optical fiber connector 4 is fixed on the fiber fixing member by a resin injected into the second metal housing 71. As a resin used at this time, a thermosetting epoxy resin is generally used. However, an acryl resin can also be used. Note that an optical fiber unit 80 has the same structure as of the optical fiber unit 70.

The end faces of the optical fiber units 70 and 80 are then polished.

The end faces of the optical waveguide unit 60 manufactured in the above process are abutted against the end faces of the optical fiber units 70 and 80, respectively, through a resin. As this resin, a silicone resin is used. However, an epoxy resin may also be used. This resin is used to achieve refractive index matching between the optical waveguide and the optical fiber 10 and normally has a refractive index substantially equal to those of the optical waveguide and the optical fiber. Therefore, this resin must be surely coated between the optical waveguide and the optical fiber. However, the resin may be coated on another portion (e.g., on the entire surface of a junction portion 73). At this time, alignment of the optical waveguide and the optical fibers 10 is performed such that signals can be correctly transmitted between the optical waveguide and the optical fibers 10 contained in the optical fiber connectors 4 and 5.

Figure 12:
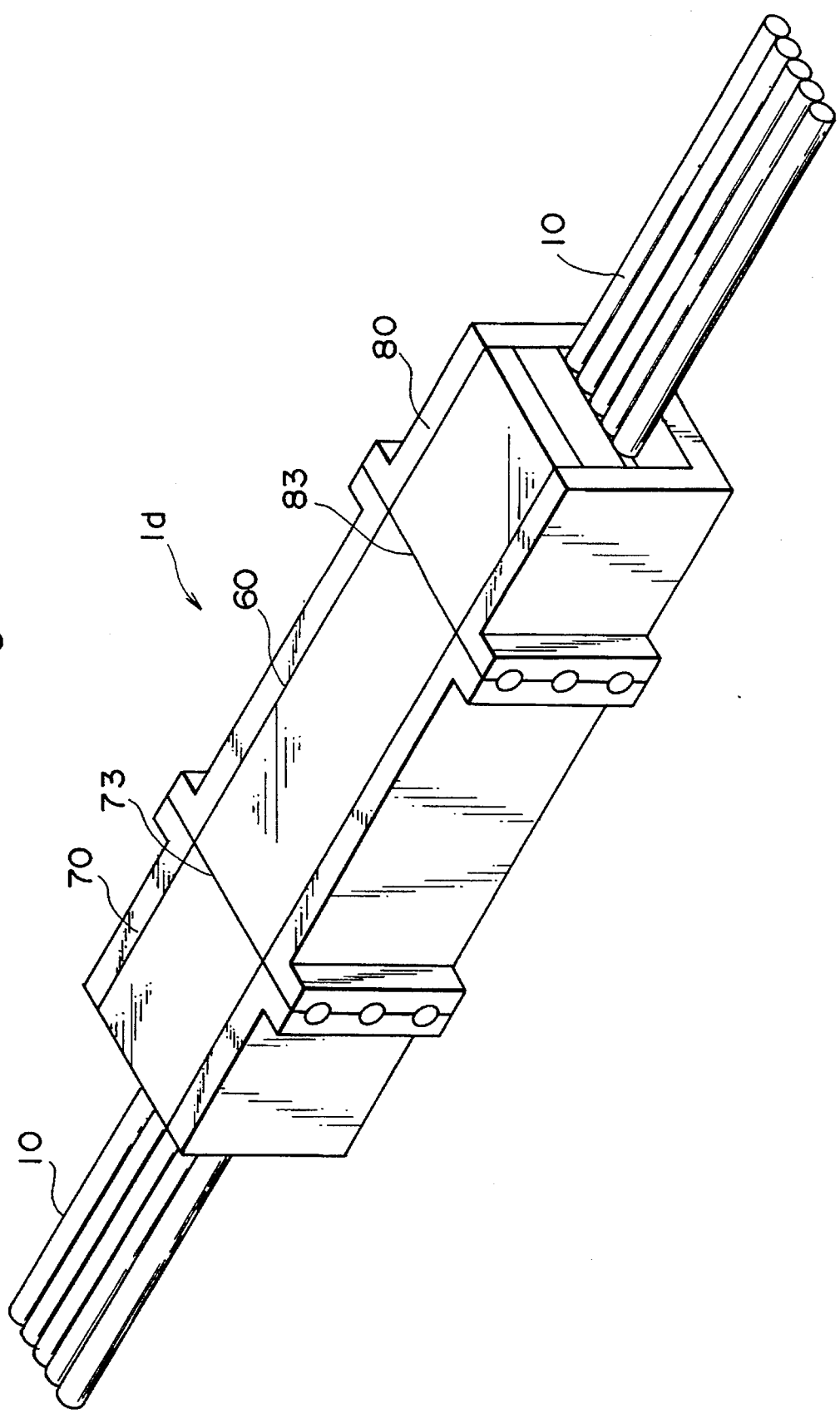

As shown in FIG. 12, each of the two sides of the junction portion 73 or 83 between the end faces of optical waveguide unit 60 and the optical fiber unit 70 or 80, which have been aligned, is spot-welded at three points (six points in total for each junction portion) to temporarily fix the optical waveguide unit 60 and the optical fiber unit 70 or 80.

In this embodiment, when spot welding is performed for temporary fixing, a YAG laser is used. However, other methods may be used to perform spot welding as a matter of course.

In this embodiment, six points are selected as temporary fixing points. However, the number of temporary fixing points is not limited to this. Any number of points may be fixed as long as the optical waveguide unit and the optical fiber units can be certainly fixed.

Dry hot air is blown against the junction portions 73 and 83 formed between the end faces of the optical waveguide unit 60 and the end faces of the optical fiber units 70 and 80 through the resin, thereby applying heat to harden the resin. At this time, the heat is applied at a temperature of 80° C. for 60 minutes. The junction portions 73 and 83 are only temporarily fixed at the two sides, and there are gaps in the junction portions 73 and 83. For this reason, a gas generated from the resin upon application of the heat escapes outside and does not remain between the end faces of the optical waveguide unit 60 and the end faces of the optical fiber units 70 and 80. As a means for applying the heat to the junction portions 73 and 83, dry hot air may be blown as described above, or the junction portions may be directly heated at an appropriate temperature by using a heater or the like.

As a means for hardening the resin, in addition to the method used in this embodiment, a method by a deoxidation process can also be used. More specifically, the manufacturing container is evacuated to remove oxygen, thereby hardening the resin, or the oxygen is replaced by nitrogen, argon or the like to remove the oxygen from the manufacturing container, thereby hardening the resin.

Figure 13:
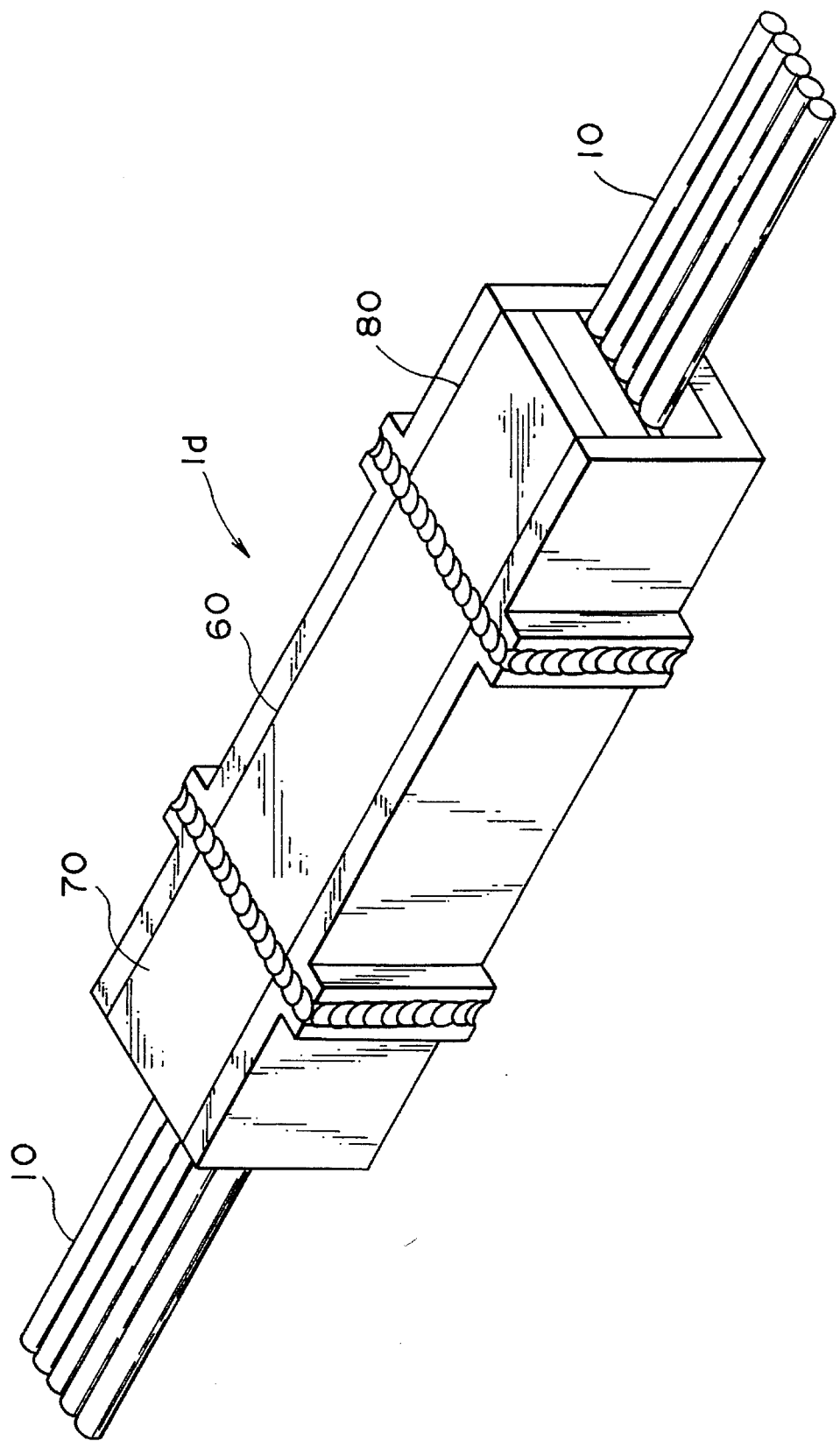

After the resin is completely hardened, as shown in FIG. 13, seam welding is performed using the YAG laser to hermetically seal the junction portions 73 and 83, thereby forming the optical waveguide module. In this seam welding, the welding position is gradually moved forward along the sides of the junction portions 73 and 83 to sequentially weld them.

According to the fourth embodiment, the gas generated upon application of heat to harden the resin escapes outside before hermetic sealing is performed by seam welding. Therefore, the gas does not remain between the end faces of the optical waveguide unit 60 and the end faces of the optical fiber units 70 and 80. As a result, an optical waveguide module with no performance degradation and hence predetermined long-term reliability can be provided.

Figure 14:
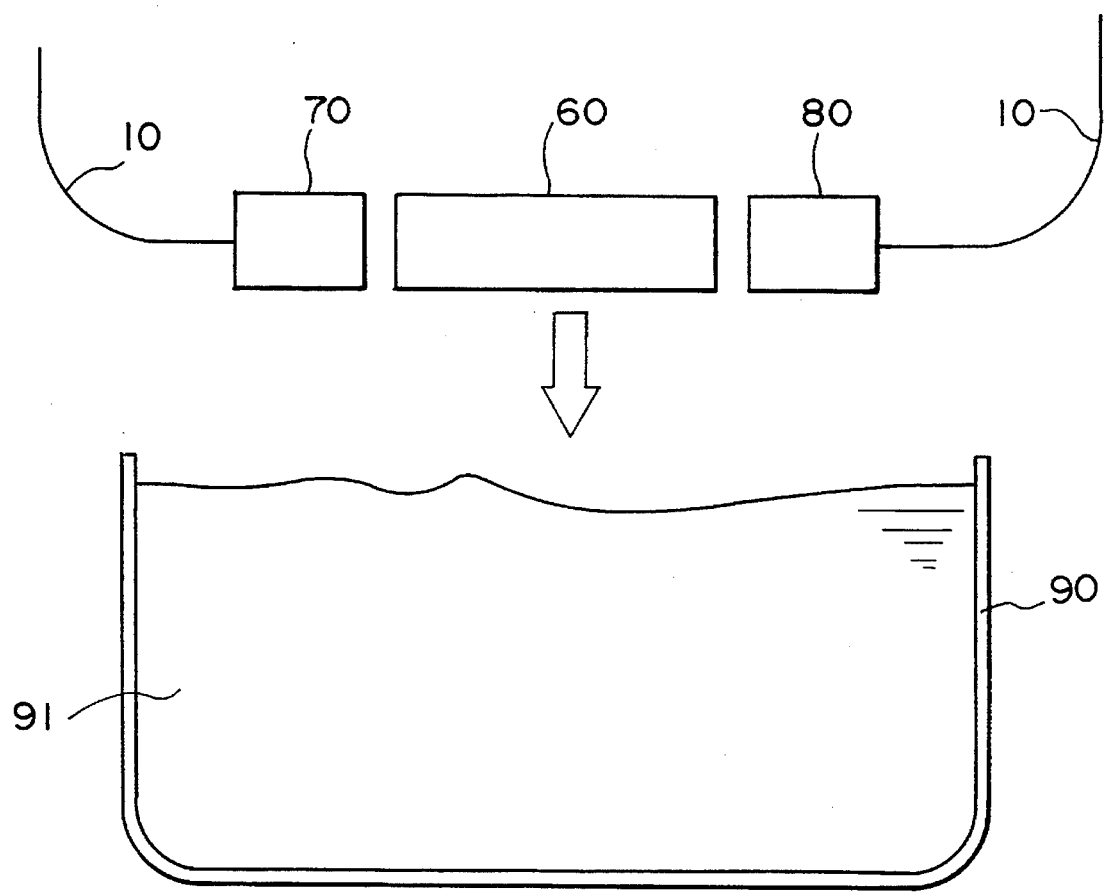
FIGS. 14 to 16 are perspective views sequentially showing steps in the manufacture of an optical waveguide module according to the fifth embodiment of the present invention.
Figure 15:
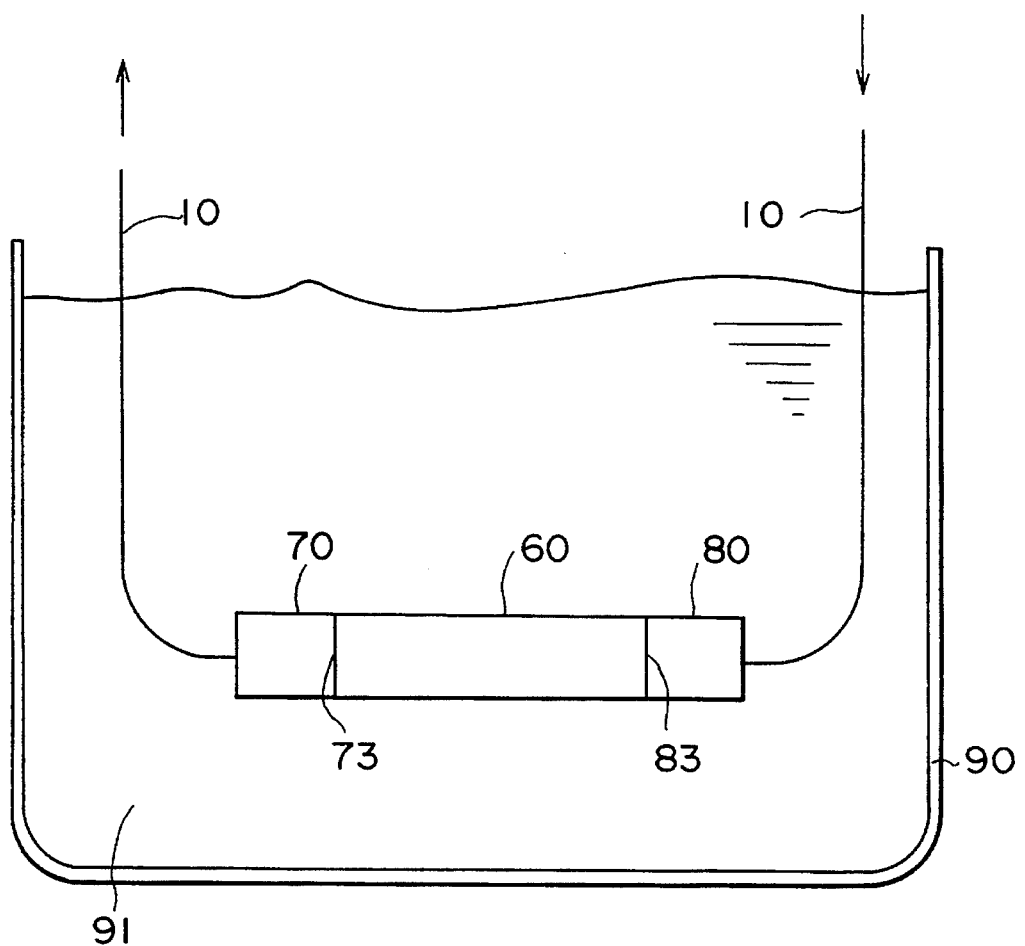
Figure 16:
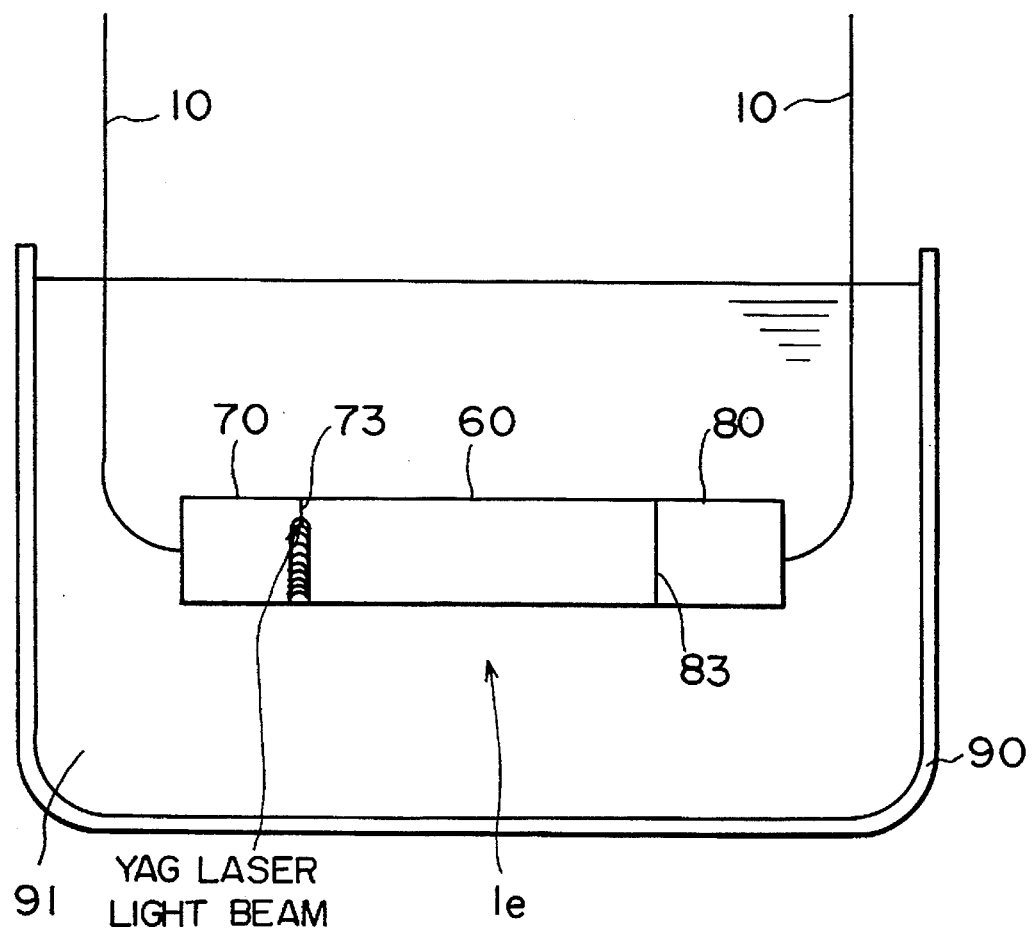

FIGS. 14 to 16 are views sequentially showing steps in the manufacture of an optical waveguide module according to the fifth embodiment of the present invention.

Steps in the manufacture of an optical waveguide unit 60 and optical fiber units 70 and 80 in the fifth embodiment are the same as in the fourth embodiment, and a detailed description thereof will be omitted.

As shown in FIG. 14, the optical waveguide unit 60 and the optical fiber units 70 and 80 to be connected to the optical waveguide unit 60 are dipped in a silicone oil 91 in an oil tank 90. This silicone oil 91 serves as a matching oil for attaining refractive index matching between the optical waveguide and an optical fiber 10 when the optical waveguide unit 60 is connected to the optical fiber units 70 and 80. The optical waveguide unit 60 and the optical fiber units 70 and 80 are held in the oil tank 90 by a holding means (not shown). When the silicone oil 91 is uniformly coated on the end faces of the optical waveguide unit 60 and the optical fiber units 70 and 80 in advance, the silicone oil 91 can be further uniformly sealed.

As shown in FIG. 15, while the optical waveguide unit 60 and the optical fiber units 70 and 80 are kept dipped in the silicone oil 91, an alignment operation of the optical waveguide and the optical fiber 10 is performed. This alignment operation is performed while causing light to be incident on one optical fiber 10 and monitoring the light passing through the optical waveguide and emerging from the other optical fiber 10. At this time, alignment of the optical waveguide and the optical fibers 10 is performed such that signals can be correctly transmitted between the optical waveguide and the optical fibers 10 contained in optical fiber connectors 4 and 5, as a matter of course.

As shown in FIG. 16, while the optical waveguide unit 60 and the optical fiber units 70 and 80 are kept dipped in the silicone oil 91 after the alignment operation, a YAG laser beam is radiated to perform seal welding to hermetically seal junction portions 73 and 83 between the end faces of the aligned optical waveguide unit 60 and the optical fiber units 70 and 80, thereby forming an optical waveguide module.

As described above, when seam welding of the junction portions 73 and 83 is performed in the silicone oil 91, the junction portions 73 and 83 are hermetically sealed while the silicone oil 91 is filled between the end faces of the optical waveguide unit 60 and the optical fiber units 70 and 80. For this reason, the silicone oil 91 does not flow away, and an optical waveguide module 1e with predetermined long-term reliability can be provided.

According to the fourth and fifth embodiments, a gap is formed around the junction portion which is temporarily fixed by spot welding, and the resin is hardened in this state. For this reason, even when a heating means is used as a resin hardening means, the gas generated at this time does not remain in the junction portion and is removed. In addition, the gap is present in a wide range around the junction portion. Therefore, in addition to a method of applying heat as the resin hardening means, a method by a deoxidization process can also be used.

Further, according to the present invention, the matching oil does not flow inside the junction portion.

Therefore, according to a method of manufacturing an optical waveguide module according to the present invention, an optical waveguide module with predetermined long-term reliability can be manufactured.

What is claimed is:

1. An optical waveguide module comprising:
   an optical waveguide holder having an end face;
   an optical waveguide substrate having an end face and being mounted in said optical waveguide holder;
   an optical waveguide having an end face and being formed in said optical waveguide substrate;
   an optical fiber holder having an end face;
   an optical fiber connector having an end face and being mounted in said optical fiber holder; and
   an optical fiber having an end face and being supported by said optical fiber connector;
   wherein said end face of said optical fiber and said end face of said optical fiber connector are recessed from an end face of said optical fiber holder,
   wherein said end face of said optical waveguide holder contacts said end face of said optical fiber holder while said optical waveguide is aligned with said optical fiber, thereby forming a gap between said end face of said optical waveguide and said end face of said optical fiber and between said end face of said optical waveguide substrate and said end face of said optical fiber connector, said gap being filled with a light-transmitting hardening matching agent.

2. An optical waveguide module according to claim 1, wherein said hardening matching agent is an adhesive which is curable by any one of photocuring, thermosetting, and deoxidation.

3. An optical waveguide module comprising:
   an optical waveguide holder having an end face;
   an optical waveguide substrate having an end face and being mounted in said optical waveguide holder;
   an optical waveguide having an end face and being formed in said optical waveguide substrate;
   an optical fiber holder having an end face;
   an optical fiber connector having an end face and being mounted in said optical fiber holder; and
   an optical fiber having an end face and being supported by said optical fiber connector;
   wherein said end face of said optical waveguide and said end face of said optical waveguide substrate is recessed from an end face of said optical waveguide holder,
   wherein said end face of said optical waveguide holder contacts said end face of said optical fiber holder while said optical waveguide is aligned with said optical fiber, thereby forming a gap between said end face of said optical waveguide and said end face of said optical fiber and between said end face of said optical waveguide substrate and said end face of said optical fiber connector, said gap being filled with a light-transmitting hardening matching agent.

4. An optical waveguide module according to claim 3, wherein said hardening matching agent is an adhesive which is cured by any one of photocuring, thermosetting, and deoxidation.

5. An optical waveguide module comprising:
   an optical waveguide substrate having an end face;
   an optical waveguide having an end face and being formed in said optical waveguide substrate;
   an optical fiber connector having an end face; and
   an optical fiber having an end face and being supported by said optical fiber connector;
   wherein an end face of said optical waveguide and an end face of said optical fiber are recessed from an end face of said optical waveguide substrate and an end face of said optical fiber connector, respectively;

wherein said end face of said optical waveguide substrate contacts said end face of said optical fiber connector while said optical waveguide is aligned with said optical fiber, thereby forming a gap between said end face of said optical waveguide and said end face of said optical fiber, said gap being filled with a light-transmitting hardening matching agent.

6. An optical waveguide module according to claim 5, wherein said hardening matching agent is an adhesive which is curable by any one of photocuring, thermosetting, and deoxidation.

7. An optical waveguide module comprising:

an optical waveguide holder;

an optical waveguide substrate mounted in said optical waveguide holder;

an optical waveguide formed in said optical waveguide substrate and having end faces exposed from said optical waveguide substrate;

an optical fiber holder;

an optical fiber connector mounted in said optical fiber holder; and an optical fiber supported by said optical fiber connector and having end faces exposed from said optical fiber connector;

wherein respective end faces of said optical waveguide holder and said optical fiber holder contact each other with said optical waveguide and said optical fiber in alignment, wherein an end face of said optical waveguide substrate is bonded to an end face of said optical fiber connector while an end face of said optical waveguide is spaced from an end face of said optical fiber, wherein a light-transmitting hardening matching agent fills a space defined by said end faces of said optical waveguide and said optical fiber, wherein an interval between said end faces of said optical waveguide and said optical fiber in said space has an upper limit value corresponding to an allowable threshold value for transmission loss by said hardening matching agent between said optical waveguide and said optical fiber, and a lower limit value based on an allowable value for a peeling frequency of said hardening matching agent by a thermal stress between said optical waveguide holder and said optical fiber holder and between said optical waveguide substrate and said optical fiber connector.

8. A module according to claim 7, wherein said optical waveguide holder and said optical fiber holder are made from an invar alloy, and said optical waveguide substrate and said optical fiber connector are made from silicon, said interval between said respective end faces of said optical waveguide and said optical fiber in said gap being between 2 μm and 30 μm.

9. A module according to claim 7, wherein said optical waveguide holder and said optical fiber holder are made from stainless steel, and said optical waveguide substrate and said optical fiber connector are made from silicon, said interval between said respective end faces of said optical waveguide and said optical fiber in said gap being between 5 μm and 30 μm.

10. A method of manufacturing an optical waveguide module, comprising:

mounting an optical waveguide substrate having an optical waveguide formed therein on an optical waveguide holder, mounting an optical fiber connector supporting an optical fiber therein on an optical fiber holder, and integrally polishing end faces of said optical waveguide, said optical waveguide substrate, and said optical waveguide holder, and end faces of said optical fiber, said optical fiber connector, and said optical fiber holder, respectively;

dipping said end faces of said optical waveguide, said optical waveguide substrate and said optical waveguide holder in an etching solution to at least partially remove one of said end face of said optical waveguide and said end face of said optical waveguide substrate to be retreated from said end face of said optical waveguide holder;

bringing said end faces of said optical waveguide holder and said optical fiber holder into contact with each other while aligning said optical waveguide and said optical fiber, and depositing a light-transmitting hardening matching agent in a gap formed by bonding said end faces of said optical waveguide substrate and said optical fiber connector; and hardening said hardening matching agent to fix a junction portion between said optical waveguide substrate and said optical fiber connector.

11. A method according to claim 10, wherein said dipping step comprises the step of partially etching and removing said end face of said optical waveguide to be retreated from said end faces of said optical waveguide holder and said optical waveguide substrate.

12. A method according to claim 10, wherein said dipping step comprises the step of partially etching and removing said end face of said optical waveguide substrate to be retreated from said end faces of said optical waveguide and said optical waveguide holder.

13. A method according to claim 10, wherein said hardening step comprises the step of heating said junction portion between said optical waveguide substrate and said optical fiber connector to harden said hardening matching agent.

14. A method according to claim 10, wherein said hardening step comprises the step of using a incident light to harden said hardening matching agent.

15. A method according to claim 10, wherein said hardening step comprises the step of removing oxygen from an atmosphere in said junction portion between said optical waveguide substrate and said optical fiber connector to harden said hardening matching agent.

16. A method according to claim 10, wherein said hardening step comprises the step of fixing a junction portion between said optical waveguide holder and said optical fiber holder by YAG laser welding and then fixing said junction portion between said optical waveguide substrate and said optical fiber connector by hardening said hardening matching agent.

17. A method according to claim 10, wherein said hardening step comprises the steps of fixing a junction portion between said optical waveguide holder and said optical fiber holder by spot welding, fixing said junction portion between said optical waveguide substrate and said optical fiber connector by hardening said hardening matching agent, and hermetically sealing said junction portion between said optical waveguide holder and said optical fiber holder by seam welding.

18. A method of manufacturing an optical waveguide module, comprising:

mounting an optical waveguide substrate having an optical waveguide formed therein on an optical waveguide holder, mounting an optical fiber connector supporting an optical fiber therein on an optical fiber holder, and polishing end faces of said optical waveguide, said optical waveguide substrate, and said optical waveguide holder, and end faces of said optical fiber, said optical fiber connector, and said optical fiber holder, respectively;

dipping said end faces of said optical fiber connector, said optical fiber, and said optical fiber holder in an etching solution to at least partially remove one of said end face of said optical fiber and said end face of said optical fiber connector so as to be retreated from said end face of said optical fiber holder;

bringing said end faces of said optical waveguide holder and said optical fiber holder into contact with each other while aligning said optical waveguide and said optical fiber, and depositing a light-transmitting hardening matching agent in a gap formed by bonding said end faces of said optical waveguide substrate and said optical fiber connector; and hardening said hardening matching agent to fix a junction portion between said optical waveguide substrate and said optical fiber connector.

19. A method according to claim 18, wherein said dipping step comprises the steps of partially etching and removing said end face of said optical fiber so that said optical fiber is recessed from said end faces of said optical fiber holder and said optical fiber connector.

20. A method according to claim 18, wherein said dipping step comprises the steps of partially etching and removing said end face of said optical fiber connector so that said end face of said optical fiber connector is recessed from said end faces of said optical fiber and said optical fiber holder.

21. A method according to claim 18, wherein said hardening step comprises the step of heating a junction portion between said optical waveguide substrate and said optical fiber connector to harden said hardening matching agent.

22. A method according to claim 18, wherein said hardening step comprises the step of using a light to harden said hardening matching agent.

23. A method according to claim 18, wherein said hardening step comprises the step of removing oxygen in an atmosphere in a junction portion between said optical waveguide substrate and said optical fiber connector to harden said hardening matching agent.

24. A method according to claim 18, wherein said hardening steps comprises the steps of fixing a junction portion between said optical waveguide holder and said optical fiber holder by YAG laser welding and then fixing said junction portion between said optical waveguide substrate and said optical fiber connector by hardening said hardening matching agent.

25. A method according to claim 18, wherein said hardening step comprises the step of fixing a junction portion between said optical waveguide holder and said optical fiber holder by spot welding, fixing said junction portion between said optical waveguide substrate and said optical fiber connector by hardening said hardening matching agent, and hermetically sealing said junction portion between said optical waveguide holder and said optical fiber holder by seam welding.

26. A method of manufacturing an optical waveguide module, comprising:

bringing an end face of an optical waveguide holder, mounting thereon an optical waveguide substrate having an optical waveguide formed therein and an end face of an optical fiber holder mounting thereon an optical fiber connector supporting an optical fiber therein into contact with each other while aligning said optical waveguide and said optical fiber;

injecting a hardening matching agent having light transmission properties and a Young's modulus corresponding to a thermal stress between said optical waveguide holder and said optical fiber holder and between said optical waveguide substrate and said optical fiber connector into a junction portion between said optical waveguide substrate and the optical fiber connector, and aligning said optical waveguide and said optical fiber;

fixing a junction portion between said optical waveguide holder and said optical fiber holder by YAG laser welding; and hardening said hardening matching agent to fix said junction portion between said optical waveguide substrate and said optical fiber connector.

27. A method according to claim 26, wherein said contacting step comprises the steps of dipping end faces of said optical waveguide substrate, said optical waveguide and said optical waveguide holder in an etching solution to at least partially remove one of said end face of said optical waveguide substrate and said end face of said optical waveguide so as to be recessed from said end face of said optical waveguide holder and bringing said end faces of said optical waveguide holder and said optical fiber holder into contact with each other while aligning said optical waveguide and said optical fiber.

28. A method according to claim 26, wherein said contacting step comprises the steps of dipping end faces of said optical fiber connector, said optical fiber and said optical fiber holder in an etching solution to at least partially remove one of said end face of said optical fiber and said end face of said optical fiber connector so as to be recessed from said end face of said optical fiber holder and bringing said end faces of said optical waveguide holder and said optical fiber holder into contact with each other while aligning said optical waveguide and said optical fiber with one another.

29. A method according to claim 26, wherein said hardening step comprises the step of heating a junction portion between said optical waveguide substrate and said optical fiber connector to harden said hardening matching agent.

30. A method according to claim 26, wherein said hardening step comprises the step of using light to harden said hardening matching agent.

31. A method according to claim 26, wherein said hardening step comprises the step of removing oxygen from an atmosphere in a junction portion between said optical waveguide substrate and said optical fiber connector to harden said hardening matching agent.

32. A method of manufacturing an optical waveguide module, comprising:

bringing an end face of an optical waveguide holder mounting thereon an optical waveguide substrate having an optical waveguide formed therein and an end face of an optical fiber holder mounting thereon an optical fiber connector supporting an optical fiber therein into contact with each other and injecting a light-transmitting hardening matching agent into a junction portion between said optical waveguide substrate and said optical fiber connector;

aligning said optical waveguide and said optical fiber and fixing a junction portion between said optical waveguide holder and said optical fiber holder by spot welding;

hardening said hardening matching agent to fix said junction portion between said optical waveguide substrate and said optical fiber connector; and hermetically sealing said junction portion between said optical waveguide holder and said optical fiber holder by seam welding.

33. A method according to claim 32, wherein said contacting step comprises the step of dipping end faces of said optical waveguide substrate, said optical waveguide and said optical waveguide holder in an etching solution to at least partially remove one of said end face of said optical waveguide and said end face of said optical waveguide substrate so as to be recessed from said end face of said optical waveguide holder and bringing said end faces of said optical waveguide holder and said optical fiber holder into contact with each other while aligning said optical waveguide and said optical fiber.

34. A method according to claim 32, wherein said contacting step comprises the step of dipping end faces of said optical fiber connector said optical fiber and said optical fiber holder in an etching solution to at least partially remove one of said end face of said optical fiber connector and said optical fiber so as to be recessed from said end face of said optical fiber holder and bringing said end faces of said optical waveguide holder and said optical fiber holder into contact with each other while aligning said optical waveguide and said optical fiber.

35. A method according to claim 32, wherein said hardening step comprises the step of heating a junction portion between said optical waveguide substrate and said optical fiber connector to harden said hardening matching agent.

36. A method according to claim 32, wherein said hardening step comprises the step of causing light to be incident from an end face of said optical fiber, which is exposed outside said optical fiber connector, to harden said hardening matching agent.

37. A method according to claim 32, wherein said sealing step comprises the step of removing oxygen from an atmosphere in a junction portion between said optical waveguide substrate and said optical fiber connector to harden said hardening matching agent.

38. A method of manufacturing an optical waveguide, comprising:

dipping an optical waveguide holder mounting thereon an optical waveguide substrate having an optical waveguide formed therein and an optical fiber holder mounting thereon an optical fiber connector supporting an optical fiber therein into a refractive index matching agent having light transmission properties and bringing end faces of said optical waveguide holder and said optical fiber holder into contact with each other; and aligning said optical waveguide and said optical fiber and hermetically sealing a junction portion between said optical waveguide holder and said optical fiber holder by seam welding.

39. A method according to claim 38, wherein said dipping step comprises the step of dipping end faces of said optical waveguide substrate, said optical waveguide and said optical waveguide holder in an etching solution to at least partially remove one of said end face of said optical waveguide and said end face of said optical waveguide substrate so as to be recessed from said end face of said optical waveguide holder and dipping said optical waveguide holder and said optical fiber holder in said refractive index matching agent and bringing said end faces of said optical waveguide holder and said optical fiber holder into contact with each other.

40. A method according to claim 38, wherein said dipping step comprises the step of dipping end faces of said optical fiber connector, said optical fiber and said optical fiber holder in an etching solution to at least partially remove one of said end face of said optical fiber and said end face of said optical fiber connector so as to be recessed from said end face of said optical fiber holder and dipping said optical waveguide holder and said optical fiber holder in said refractive index matching agent and bringing said end faces of said optical waveguide holder and said optical fiber holder into contact with each other.

41. An optical waveguide module comprising:

an optical waveguide holder having an end face;

an optical waveguide substrate having an end face and being mounted in said optical waveguide holder;

an optical waveguide having an end face and being formed in said optical waveguide substrate;

an optical fiber holder having an end face;

an optical fiber connector having an end face and being mounted in said optical fiber holder; and an optical fiber having an end face and being supported by said optical fiber connector;

wherein said end face of said optical waveguide holder and said an end face of said optical fiber holder contact each other such that said optical waveguide and said optical fiber are aligned with one another, wherein one of an end face of said optical waveguide substrate and an end face of said optical waveguide is recessed from said end face of said optical waveguide holder, wherein a gap is formed between said end face of said optical waveguide and said end face of said optical fiber or between said end face of said optical waveguide substrate and said end face of said optical fiber connector, said gap being filled with a light-transmitting hardening matching agent.

42. An optical waveguide module according to claim 41, wherein said end face of said optical waveguide is recessed from said end face of said optical waveguide holder and said end face of said optical waveguide substrate, and said gap is formed between said end face of said optical waveguide and said end face of said optical fiber.

43. An optical waveguide module according to claim 42, wherein a distance by which said end face of said optical waveguide is recessed from said end face of said optical waveguide holder has an upper limit based on an allowable transmission loss amount due to said hardening matching agent between said optical waveguide and said optical fiber and a lower limit based on an allowable peeling frequency of said hardening matching agent due to thermal stress between said optical waveguide holder and said optical fiber holder and between said optical waveguide substrate and said optical fiber connector.

44. An optical waveguide module according to claim 43, wherein said optical waveguide holder and said optical fiber holder are made from an invar alloy and said optical waveguide substrate and said optical fiber connector are made from silicon, said end face of said optical waveguide being recessed from said end face of said optical waveguide holder between 2 to 30 µm.

45. An optical waveguide module according to claim 43, wherein said optical waveguide holder and said optical fiber holder are made from stainless steel, and said optical waveguide substrate and said optical fiber connector are made from silicon, said amount by which said end face of said optical waveguide is recessed from said end face of said optical waveguide holder being between 5 µm and 30 µm.

46. An optical waveguide module according to claim 41, wherein said end face of said optical waveguide substrate is recessed from said end face of said optical waveguide holder and said end face of said optical waveguide, and said gap is formed between said end face of said optical waveguide substrate and said end face of said optical fiber connector.

47. An optical waveguide module according to claim 41, wherein said hardening matching agent is an adhesive curable by any one of photocuring, thermosetting and deoxidation.

48. An optical waveguide module comprising:

an optical waveguide holder having an end face;

an optical waveguide substrate having an end face and being mounted in said optical waveguide holder;

an optical waveguide having an end face and being formed in said optical waveguide substrate;

an optical fiber holder having an end face;

an optical fiber connector having an end face and being mounted in said optical fiber holder; and an optical fiber having an end face and being supported by said optical fiber connector;

wherein one of an end face of said optical fiber and an end face of said optical fiber connector is recessed from an end face of said optical fiber holder;

wherein said end face of said optical waveguide holder contacts said end face of said optical fiber holder, thereby forming a gap between said end face of said optical waveguide and said end face of said optical fiber or between said end face of said optical waveguide substrate and said end face of said optical fiber connector, said gap being filled with a light-transmitting hardening matching agent.

49. An optical waveguide module according to claim 48, wherein said end face of said optical fiber is recessed from said end face of said optical fiber holder and said end face of said optical fiber connector, and said gap is formed between said end face of said optical fiber and said end face of said optical waveguide.

50. An optical waveguide module according to claim 49, wherein an amount by which said end face of said optical fiber is recessed from said end face of said optical fiber holder has an upper limit value based on an allowable optical loss amount due to said hardening matching agent between said optical waveguide and said optical fiber, and a lower limit value based on an allowable peeling frequency of said hardening matching agent due to a thermal stress between said optical waveguide holder and said optical fiber holder and between said optical waveguide substrate and said optical fiber connector.

51. An optical waveguide module according to claim 50, wherein, when said optical waveguide holder and said optical fiber holder are made from an invar alloy and said optical waveguide substrate and said optical fiber connector are made from silicon, wherein said amount by which said end face of said optical fiber is recessed from said end face of said optical fiber holder is between 2 µm and 30 µm.

52. An optical waveguide module according to claim 50, wherein said optical waveguide holder and said optical fiber holder are made from stainless steel and said optical waveguide substrate and said optical fiber connector are made from silicon, wherein said amount by which said end face of said optical fiber is recessed from said end face of said optical fiber holder is between 5 µm and 30 µm.

53. An optical waveguide module according to claim 48, wherein said end face of said optical fiber connector is recessed from said end face of said optical fiber and said end face of said optical fiber holder, and said gap is formed between said end face of said optical fiber connector and said end face of said optical waveguide substrate.

54. An optical waveguide module according to claim 48, wherein said hardening matching agent is an adhesive curable by any one of photocuring, thermosetting and deoxidation.

* * * * *